US008529746B2

(12) United States Patent
Grant et al.

(10) Patent No.: US 8,529,746 B2
(45) Date of Patent: Sep. 10, 2013

(54) METHODS FOR PRODUCING TEXTURED ELECTRODE BASED ENERGY STORAGE DEVICE

(75) Inventors: Robert W. Grant, Camden, ME (US); Matthew Sweetland, Bedford, MA (US)

(73) Assignee: Nanoscale Components, Inc., Hudson, NH (US)

( * ) Notice: Subject to any disclaimer, the term of this patent is extended or adjusted under 35 U.S.C. 154(b) by 0 days.

(21) Appl. No.: 13/018,586

(22) Filed: Feb. 1, 2011

(65) Prior Publication Data

US 2011/0195293 A1 Aug. 11, 2011

Related U.S. Application Data

(63) Continuation of application No. PCT/US2010/058418, filed on Nov. 30, 2010.

(60) Provisional application No. 61/265,167, filed on Nov. 30, 2009, provisional application No. 61/353,500, filed on Jun. 10, 2010.

(51) Int. Cl.
 *H01M 4/139* (2010.01)
 *C25D 9/02* (2006.01)

(52) U.S. Cl.
 USPC ............ 205/58; 205/57; 205/108; 205/137; 205/317

(58) Field of Classification Search
 USPC ................................ 205/57, 111, 112, 316, 58
 See application file for complete search history.

(56) References Cited

U.S. PATENT DOCUMENTS

| 2,574,844 | A | * | 11/1951 | Roden ............................. 34/649 |
| 4,029,564 | A | * | 6/1977 | Higuchi et al. ........... 204/224 R |
| 4,130,500 | A | | 12/1978 | Melendres et al. |
| 4,940,640 | A | | 7/1990 | MacDiarmid |

(Continued)

FOREIGN PATENT DOCUMENTS

| WO | 98/38224 A1 | 9/1998 |
| WO | 2005/033685 A2 | 4/2005 |

(Continued)

OTHER PUBLICATIONS

Zou et al., "Remarkably Enhanced Capacitance of Ordered Polyaniline Nanowires Tailored by Stepwise Electrochemical Deposition" J. Solid State Electrochem. 11, pp. 317-322 (2007).*

*Primary Examiner* — Harry D Wilkins, III
*Assistant Examiner* — Bryan D. Ripa
(74) *Attorney, Agent, or Firm* — Elmore Patent Law Group, P.C.; Carolyn S. Elmore, Esq.; Darlene A. Vanstone, Esq.

(57) ABSTRACT

This method enables the use of nanowire or nano-textured forms of Polyaniline and other conductive polymers in energy storage components. The delicate nature of these very high surface area materials are preserved during the continuous electrochemical synthesis, drying, solvent application and physical assembly. The invention also relates to a negative electrode that is comprised of etched, lithiated aluminum that is safer and lighter weight than conventional carbon based lithium-ion negative electrodes. The invention provides for improved methods for making negative and positive electrodes and for energy storage devices containing them. The invention provides sufficient stability in organic solvent and electrolyte solutions, where the prior art processes commonly fail. The invention further provides stability during repetitive charge and discharge. The invention also provides for novel microstructure protecting support membranes to be used in an energy storage device.

16 Claims, 15 Drawing Sheets

(56) References Cited

U.S. PATENT DOCUMENTS

| | | | | |
|---|---|---|---|---|
| 5,023,149 A | * | 6/1991 | MacDiarmid et al. | 429/523 |
| 5,166,063 A | * | 11/1992 | Johnson | 435/173.2 |
| 5,374,491 A | * | 12/1994 | Brannan et al. | 429/235 |
| 6,068,755 A | * | 5/2000 | Matsuda et al. | 205/333 |
| 6,176,995 B1 | * | 1/2001 | Schneider | 205/125 |
| 6,475,670 B1 | * | 11/2002 | Ito | 429/217 |
| 7,122,106 B2 | * | 10/2006 | Lin et al. | 205/109 |
| 7,169,284 B1 | * | 1/2007 | Jiang et al. | 205/317 |
| 7,195,834 B2 | | 3/2007 | Srinivas | |
| 2003/0143461 A1 | | 7/2003 | Poehler et al. | |
| 2005/0140278 A1 | | 6/2005 | Kato | |
| 2006/0032752 A1 | * | 2/2006 | Luch | 204/622 |
| 2006/0057448 A1 | | 3/2006 | Miyauchi et al. | |
| 2006/0272950 A1 | * | 12/2006 | Martyak et al. | 205/261 |

FOREIGN PATENT DOCUMENTS

| | | |
|---|---|---|
| WO | 2007/098203 A2 | 8/2007 |
| WO | 2008/124167 A1 | 10/2008 |
| WO | 2009/133411 A1 | 11/2009 |

\* cited by examiner

METHODS FOR PRODUCING TEXTURED ELECTRODE BASED ENERGY STORAGE DEVICE

RELATED APPLICATIONS

This application is a continuation of International Application No. PCT/US10/58418, which designated the United States and was filed on Nov. 30, 2010, published in English, which claims the benefit of U.S. Provisional Application No. 61/265,167, filed Nov. 30, 2009 and U.S. Provisional Application No. 61/353,500, filed Jun. 10, 2010. The entire teachings of the above applications are incorporated herein by reference.

BACKGROUND OF THE INVENTION

In 1986, Alan MacDiamid won a Nobel Prize for his work in conductive polymers. In his U.S. Pat. No. 4,940,640, MacDiamid disclosed the chemical nature of polyaniline and the five possible states of oxidation. At that time, polyaniline was synthesized by chemical routes, and later stimulated into various electrical states by electrochemistry. In the early 1990's, researchers such as V. Gupta and M. Pasquali, published the construction of polyaniline and polypyrrole conductive nanowires by electrochemical synthesis in acids such as Hydrochloric, Sulphuric and Perchloric acids. These films had very high electrolytic performance, but were fairly unstable physically and electrically, decomposing in use. Over the years since then, gradual increases in chemical stability have been achieved by including dopant donors such as sulphonic acid. In this case, the $RSO_3^-$ anion is synthesized into the polyaniline, creating a more stable material, albeit at the expense of slower growth or poorer adhesion at the electrode. Since the initial work, many papers have been published regarding electrochemical and chemical synthesis; however, there has been a distinct lack of implementation of the most useful forms of conductive polymers due to the delicate nature of "brush" like features. The loose fibers or nano-texture can mat down during assembly to the opposing electrode, reducing most of the useful surface area. The current collectors for the studies have been primarily noble metals, which are costly and therefore, limiting to commercial applications. Lack of adhesion to other less noble metals primarily due to oxidation has also limited their use. Commercial applications of conductive polymers have therefore been via the bulk chemical (granular) synthesis route, where the available specific surface areas are as much as ten times less as compared to the more delicate electrochemically grown nano-texture.

Therefore, it is an object of the present invention to provide a method for producing nano-textured conductive polymers on non-noble metal electrodes wherein the delicate nature of these very high surface area materials is preserved during the continuous electrochemical synthesis, drying, solvent application and physical assembly and repetitive charge and discharge.

SUMMARY OF THE INVENTION

The invention relates to the synthesis of a conductive polymer onto a non-noble metal electrode. High power and high energy organic nanowire ultracapacitors (supercapacitors) or batteries are made from low-cost materials, and produced by an automated continuous sheet process. The continuous method of manufacture includes electrochemical techniques: One technique is especially adapted to initiate a favorable seed layer or template for growth of the conductive polymer that has good adhesion and electrical properties; another technique provides rapid growth upon the seed layer or template while propagating favorable morphology and electrical properties. The invention also relates to a negative electrode that is comprised of etched, lithiated aluminum that is safer and lighter weight than conventional carbon based lithium-ion negative electrodes. The invention provides for improved methods for making negative and positive electrodes and for energy storage devices containing them. The invention provides sufficient stability in organic solvent and electrolyte solutions, where the prior art processes commonly fail. The invention further provides stability during repetitive charge and discharge. The invention also provides for novel microstructure protecting support membranes to be used in an energy storage device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
FIG. 2: Electrode layered structure.
Figure 2:
Figure 2:
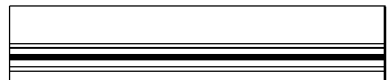

The invention relates to improved electrodes comprising a support, linker layer, and conductive polymers on one, two or more sides of the support as shown in FIG. 2. The electrode can preferably be in the shape of a conductive ribbon or similar sheet having conductive polymer on both sides. The methods of the invention can be used to make the improved electrodes continuously or semi-continuously, as desired, and allow for electrode creation via chemical and electrochemical process steps which can be applied simultaneously to both sides of the substrate.

The invention also relates to an innovation in chemistry, whereby the incorporation of high energy density (high surface morphology), successful synthesis on commodity metals, and successful transfer to organic electrolytes allows for low cost, high density energy storage.

The invention further relates to improved energy storage manufacturing. The fundamental innovation in energy storage manufacturing is the ability to synthesize nano-textured material in a continuous, non-contact process. The non-contact electrochemical synthesis allows the use of exceptionally thin substrates due to the low forces and tensions required by the non-contact process. The use of such thin substrates in turn lends itself to optimization through stacked design as a means of minimizing electrical path length and corresponding resistance. Low cost and high specific energy are achieved by using very small amounts of lightweight, commodity-priced metals.

Figure 1:
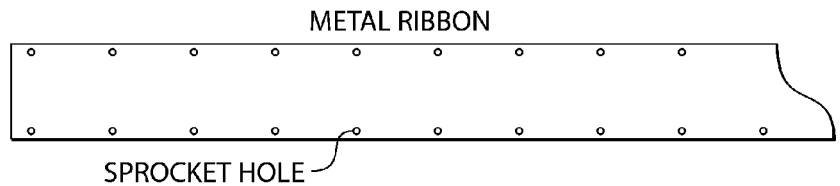
FIG. 1: Metal ribbon.

The electrode comprises a support, a linker or bifunctional agent and a conductive polymer having a very high surface area. The electrode can be any shape or size. However, the electrode is preferably a thin sheet or plate. Ribbons of thin electrode, where the length far exceeds the width, are particularly preferred as they facilitate an efficient continuous processing. In this embodiment, the width is selected to correlate to the width of the finished product. The ribbon can then be easily cut to the length of the finished product for final assembly. FIG. 1 illustrates such a ribbon. The embodiment in FIG. 1 shows optional sprocket holes along the length of the ribbon.

The support should be sufficiently thick as to provide meaningful support and durability to the device, thereby protecting the polymer structure from physical stresses which can be caused by bending and flexing. However, the support should not be so thick as to be unjustly heavy for the contemplated use. In many applications, the thickness of the support can be less than about 100 microns, preferably less than about 50 microns and more preferably less about 10 microns. Further, the support can generally be greater than about 4 microns.

The support can be made of a large variety of materials. It is understood that the support comprises a conductive material or metal. In an alternative embodiment, the conductive material can coat a substrate (which need not be conductive), such as polymers, plastics, cellulosic materials, resins, glass, ceramics, metals, graphite and the like. A polymeric support can be a polyester, such as polyethylene terephthalate, PET.

The electrode can be made of, contain or be coated with a conductive metal, e.g. Titanium, Aluminum, Nickel, Stainless Steel, Tin, Gold, and Platinum. Non-noble metals are preferred due to their lower cost. Aluminum is preferred because of its low cost and availability. Nickel is preferred due to its low cost and relative chemical stability of its surface.

In this example, the thickness of the metal is about 2000 Angstroms thick each side on a 4 micron or greater thick polymer sheet such as polyester. Other polymers such as treated BOPP (biaxially oriented polypropylene) can be used, but polyesters have good to excellent natural adhesion properties with regard to evaporated metals. Sprocket holes can be incorporated along one or both lengths of the ribbon to facilitate transport through the process.

In one embodiment of the invention, the process includes deposition of an evaporated conductive metal on a substrate or an electroplating step to produce the support. Such processes are well known in the art. Preferably, thin films or foils of conductive materials are preferred.

In a preferred embodiment of the invention, a conductive and exfoliable (sheets can be rubbed off by friction) form of carbon such as graphite or graphene (cgg) is scrubbed, or buffed, onto the surface of the electrode substrate or base metal electrode base. The exfoliable carbon becomes imbedded in the electrode substrate and provides a conductive and chemically stable support (for linking between the metal and polyaniline or PANi) for the electrochemically synthesized polymer. Although conductive polymers have been synthesized over hard, polished carbon substrates, it is here discovered that conductive polymers can be electrochemically synthesized onto graphite micro-particles on base metals while maintaining the electrical performance of a film grown onto noble metal substrates. The graphite micro-particles create a link between the base metal and the PANi film to afford a method for attaching PANi to surfaces that have up to this date proven extremely difficult to achieve in non aqueous environments.

Graphite or graphene can be applied to the thin metal electrode by a buffer pad at high speed, either in a random, circular or unidirectional pattern. For example, a moving belt or orbital buffing device (e.g. 4000-11000 rpm at 1-20 psi) can be used. The thickness of the carbon layer so produced in 1 to 10 seconds of application can be uniform, continuous and 10 to 100 nanometers in thickness.

An example of a suitable buffering process can be adapted from U.S. Pat. No. 6,511,701, which is incorporated herein by reference. In the process, dry carbon particles can be applied to a metal, preferably aluminum, surface uniformly. In the present invention a buffing pad can be moved in the plane of the substrate parallel to the substrate surface, or surfaces. The random orbital motion of the pad in the present invention is carried out with its rotational axis perpendicular to the substrate or web. Since the electrode is moving in the longitudinal direction, a simple linear or back and forth motion in the latitudinal direction will also suffice. The coating does not require the heating step described therein. Further, the units can be modular such that by stacking multiple units on top of each other, both sides of the substrate can be coated such that a first side is coated in a first unit and the film is then directed (up or down) to a second unit where the opposing side is coated. A hardened stainless steel pressure plate is used to apply a uniform and controllable pressure to the film/vibrator pad interface. The modular units are sealed and kept under a negative pressure to keep the graphite powder contained.

The electrochemically grown polymerization begins immediately on this surface, produced over metals, such as aluminum. The adhesion of the synthesized polymer on this carbon imbedded surface on aluminum, as measured by a cellophane tape pull-off test, is good, and the electrical stability of the film is good through 6500 cycles in non-aqueous electrolyte. It is preferred that the carbon micro particulate (less than a continuous film) be formed on as received oil-free aluminum; Cleaning the aluminum with e.g. phosphoric acid or sodium hydroxide will alter the native oxide and alter the performance of the film during synthesis initiation due to the heavy aluminum oxidation current produced. If the aluminum is fresh (without any oxide), then a controlled partial oxidation can be achieved with steam, hot air, etc., treatments known in the art. Preferably the native oxide is established prior to carbon imbedding, but it is possible to oxidize the aluminum in a second step following carbon imbedding. Preferably the aluminum may be ensured to be oil-free via exposure to corona discharge.

In case of the use of a chemical linker, the growth of the conductive polymer on non-noble metals can be described as five steps: 1) The metal surface of the support is stripped bare to (or provided as) a non-oxidized metal; 2) Hydroxylation is achieved in order to facilitate a chemical reaction; 3) A bifunctional agent is linked onto the surface (A chemical having or involving two functional groups or binding sites); 4) Polymer growth is initiated onto the linker or bifunctional layer; and 5) Polymer growth is proliferated. A lesser set of steps may be desired for noble metal applications. A more detailed explanation follows:

1) In order to clean the substrate down to bare metal, either mechanical means (e.g. brushing or polishing) or chemical means such as 3:1 room temperature HCl:HNO$_3$ in water solution for a number of seconds (e.g. 15 seconds) is performed. Other immersion times such as five seconds or 200 seconds are also possible, but too little time does not clear the oxide and too much time may remove too much metal. A corona discharge may also be applied in order to remove hydrocarbon material.

2) In order to Hydroxylate Nickel, for example, the metal surface is immersed in 1 molar KOH with several (e.g. 2 or more, such as between 3 and 10) cyclic voltammetry cycles between 0.2 and 0.5 volts re. Ag/AgCl. The rate can be conveniently applied at 20 mV/sec in a basic solution, such as a 2M aqueous NaOH solution. There are other ways to Hydroxylate Nickel, for example with the use of bases at elevated temperature. The CV method is preferred since it avoids conditions where excessive oxidation takes place. Aluminum, Titanium and other metals can also be hydroxylated by treatments with various bases such as Sodium Carbonate, metal Hydroxides, etc. The hydroxylated product can be rinsed, if desired.

3) In order to prepare a stable and favorable surface to polymer growth, a chelating or bifunctional agent-containing solution, such as Phthalic or Phosphonic acid can be used. Bifunctional agents include compounds which will react with the support and, directly or indirectly, with the monomer. Phthalic acid results in a covalently attached, organic, hydrophobic linker upon which the polyaniline can readily grow. The metal Hydroxylated surface from step 2 is immersed in the linker solution (that may include additives such as acetonitrile to guard against premature loss of protons) at an elevated temperature for several seconds or minutes (details to follow). This reaction can be performed in a dry organic solvent, such as DMSO. Suitable temperatures include 65° C. for about 10 min, for example. Other temperatures and reaction times can be used as well with acceptable results. In this way, the surface of the non-noble metal substrate is made ready for conductive polymer deposition. The films can be rinsed in an organic solvent and, optionally, dried. The films can be used immediately or stored, for example, in a container with a desiccant. Subsequent to this, the linker can be subject to delamination if the pH or pKA is too high and must be preserved.

Polyaniline can be grown on either the cgg layered electrode or the chemically modified electrode. Polyaniline grows in at least two phases (MacDiamid), lateral surface coverage, and vertical or connected growth. The chemical reactions that take place initially to cover the surface of the substrate (in the preferred case the linker layer) are thought to be different than in full growth phase. The electrochemical potential that drives the early or templating phase reactions can also be different. In order to stimulate good adhesion and high surface area morphology, a CC (constant current) or CV (cyclic voltammetry) step may be used to establish a seed or templating layer for the conductive polymer.

High speed growth is achieved with the benefit of a good template or seed layer formed above. The nature of a good template layer is characterized by good adhesion, electrical conductivity, and a surface that promotes high surface area morphology growth. PS (potentiostatic) or CC (constant current) growth conditions are selected since they are nearly twice as fast as other methods, and more preferably potentiostatic mode is preferred since the growth is independent of the substrate surface area. Multiple potentiostatic growth regions, at progressively higher voltages, may be preferred to further accelerate growth. A further explanation of this rapid phase growth is given below.

The method provides for the deposition of a high surface area, conductive polymer, such as polyaniline, synthesized directly onto the ribbon or substrate using a combination of electrochemical synthesis techniques selected from: Potentiostatic (PS), Constant Current (CC), Pulsed Potentiostatic (PP), Cyclic Voltammetry (CV). The following is a discussion of the advantages and disadvantages of the various methods.

PS growth is very fast and proliferates an existing morphology but often affords a delayed initiation of growth. Delayed initiation can lead to an oxidized surface on the metal substrate, poor adhesion, and less desirable morphology compared to nanowires. PS growth can direct energy toward the desired reaction if it is well identified. CV growth stimulates many different reactions on the surface and can help initiate favorable reactions less well defined and missed by PS growth such as a desirable template for high surface area polymer growth. CV also is slower in overall growth rate when compared to PS or CC. CC growth allows for self selecting reactions; i.e. the reactions on the surface determine to a large extent the resulting voltage. PP is slower than PS but creates higher instantaneous currents. This can be useful if the voltage and time span of the pulse is varied over a range that includes favorable reactions. In a way, this is similar to the CV method. The overall conductive polymer growth disclosed utilizes one or more, such as two or more of these methods to achieve high quality seed layers and sustained rapid growth necessary for production applications.

The conductive material is a polymer produced in situ. Conductive polymers include polyisothianaphthene, polypyrrole, polythiophene and polyaniline and substituted or unsubstituted derivatives thereof. However, polypyrrole, polythiophene and polyaniline containing polymers and their substituted and unsubstituted derivatives are preferred for the present invention because they are inexpensive and easily handled. Polyanilines are most preferred. The focus herein is polyanilines. However, the polyanilines can be substituted with the other polymers.

The disclosed method can allow for complete growth within about 5-90 minutes, depending on amount of growth desired and growth conditions, on an optionally moving segment of the substrate or metal ribbon.

The Physical Growth Procedures:

Electrochemical baths motivate ions to flow within the electrolyte solution and electrons to flow in the conducting electrodes and connecting wires according to the voltage presented. The voltage potentials created between the various electrodes are fairly local due to the IR losses within the liquid and therefore separate electrodes can be used to define different conditions of voltage in order to control the flow of electrons and ions to and from the electrode surfaces. The support or ribbon-like working electrode is passed through or subjected to a first reaction zone or bath where PS, CC, PP, or CV is applied. The support is then optionally passed through or subjected to a second reaction zone or bath where PS or CC is applied. Subsequent additional reaction zones may follow. The support or working electrode is maintained in a grounded state with relation to the auxiliary electrodes. More than one counter or auxiliary electrodes are either exposed to the fluid bath directly or separated by a membrane or glass frit. Each one of the auxiliary electrodes comprises a zone in the preparation bath. CC, CV and PP have proved useful in initiating or nucleating growth and promoting a highly desirable nano-textured morphology having a very high surface area. By using at least one cycle of the CV method, a few seconds of the CC method, or at least one pulse of PP method, an improved conductive polymer electrode growth initiation can be made with high efficiency. Since the moving ribbon electrode is held at or near ground potential and the voltage potential created by the proximity of the counter electrodes in the synthesis bath is fairly local due to the IR characteristics of the electrolyte, areas of a single bath can be held at different potentials, creating different growth results.

Figure 3:
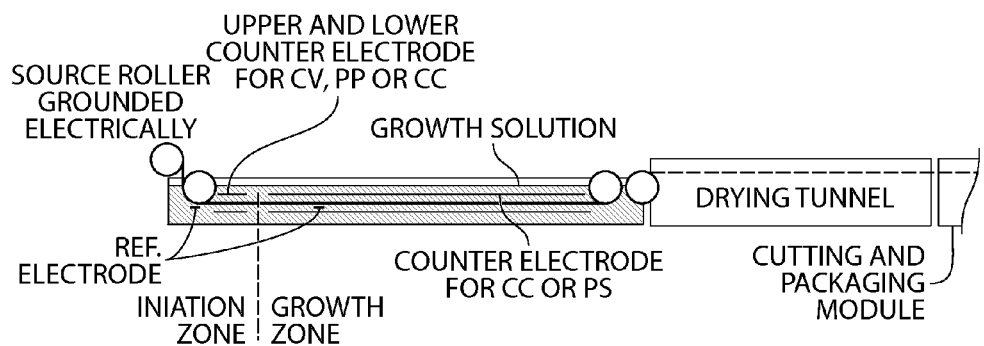
FIG. 3: Electrochemical synthesis bath.

FIG. 3 is shown as an example of growth zones created by multiple electrode arrangements. There may be several zones created to refine the approach. The first zone of the bath (see FIG. 3) has at least one working electrode, at least one counter electrode and at least one reference electrode. The working and/or counter electrode are configured such that one can alter the voltage potential between them. In the first zone (initiation), PS or CC or CV or PP can be selected. In the second zone (growth), PS or CC can be selected.

For example, when polyaniline is being produced, the voltage potential can be changed between about −0.2 and 1.2 volts versus a reference electrode such as Ag/AgCl (SCE or SHE can also be used). As the ribbon passes through this zone, it is exposed to a voltage potential that is changing, for example at a rate of at least about 5 mV/sec, preferably at least about 100 mV/sec, such as about 300 my/sec over the range stated. Other combinations are also possible. The surface of the ribbon substrate begins to grow polyaniline essentially immediately at various oxidation states, while avoiding substantial oxidation of the support metal. Thus, the invention comprises contacting the support comprising a conductive metal (which preferably has been previously treated either with a cleaning, Hydroxylation and/or bifunctional agents, or buffed/rubbed with carbon such as graphite or graphene) with a solution comprising a monomer characterized by multiple oxidations states and capable of producing a conductive polymer in the presence of at least two electrodes wherein the voltage potential or current is altered between one or more, such as two or more, voltage states. The CV, CC or PP methods are best used in this initiation phase. As opposed to potentiostatic growth at 0.825 volts vs. Ag/AgCl, where the polyaniline is grown in its near fully oxidized state, the CV method for example grows polyaniline in a full range of oxidation and reduction states which aids in the even initiation of growth on various substrates, even on non-noble metal supports, where usually oxidation inhibits polymer growth and adhesion, and particularly on the prepared surfaces as mentioned earlier. A desired nano-textured morphology can be formed more consistently and more quickly using CV, CC and PP. The reaction is generally completed very quickly and complete seeding of the support can be completed in about 1 to 100 seconds, such as 1 to 60 seconds.

In one embodiment, the film can be submerged into a low pH aqueous solution containing aniline and, for example, camphor sulfonic acid, and subjected to a 60 second constant current pulse, for example at 1 mA/cm$^2$, that initiates growth of polyaniline "buds" onto the linker end. The resulting Ni/4-APA/PANi film can then be dried, preferably, under low oxygen conditions and transferred to an organic electrolyte solution.

The seeded support can then be subjected to a second reaction zone or bath where the polymer continues to grow in the presence of an applied voltage PS or CC. The method can then be used to proliferate the desired morphology quickly (about twice as fast as the CV method) which is important to reducing manufacturing cost. In this step, the voltage and/or current is maintained to optimize polymer growth. In the example of aniline, the voltage potential is maintained such that the aniline is fully oxidized, preferably at about 0.8 (e.g., 0.825) volts, vs. Ag/AgCl. The step can be potentiostatic (PS) or galvanostatic (CC).

In another embodiment, the cgg-film can be submerged in an electrochemical cell with an electrode, e.g., a Ni counter electrode, arranged so that it envelopes both sides of the working electrode. A standard Ag/AgCl electrode can be used as the reference electrode. Camphor-10-sulfonic acid β or other sulfonating compound, can be added to the growth solution and the pH can be adjusted. A low pH is preferred, such as 1.3, and can be readily accomplished by adding sulfuric acid. The Al/C working electrode is placed in the growth solution between two Ni counter electrode plates with the distance between counter electrode and working electrode approximately 1 cm. Constant potential method can be used to grow polyaniline films on Al/C electrodes at 0.75 V vs Ag/AgCl reference. It is noteworthy that this growth voltage can be 50 mV lower than with growth on platinum or other bare metal electrodes. The film can then be rinsed with or without vacuum and/or dried.

The polymer growth step can be maintained until the desired degree of polymer growth has been achieved. Typically, the reaction will be maintained for at least about 1 minute, preferably at least about 2, 3, 4, or 5 or more minutes, up to an hour or more.

The first and second growth reaction zones can be in the same vessel or different vessels. Preferably, the zones are in the same vessel and/or in fluid communication. It is particularly advantageous that the zones are in the same bath using a single solution.

The solution in the bath contains monomer and a solvent. The solvent is preferably aqueous. The monomers are preferably a substituted or unsubstituted aniline or pyrrole, preferably unsubstituted aniline. The monomer is preferably added and/or maintained in solution, preferably approaching or at saturation. For example, aniline can be added and/or maintained in an amount of about 0.4M.

The solution optionally contains an additional acid, such as a strong acid including but not limited to HCl, HF, nitric acid, oxalic acid, sulfuric acid or a sulfonic acid. Sulfonate donors, such as sulfonic acids, including camphosulfonic acid and toluene sulfonic acids and combinations thereof are preferred. The acids are preferably added in a molar ratio of acid to monomer between about 0.5:1 to 3:1. Preferably, the acid is added in an equimolar amount to monomer.

The solution can additionally optionally contain an oxide dopant such as an oxide of Manganese, Vanadium, Iron or Cobalt. Such additional materials can be incorporated onto the surface of the electrode in order to improve the capacitance and voltage range performance of the polyaniline or other polymer. Oxides of Manganese, Vanadium, Iron, Cobalt, etc. are commercially available from Aldrich, Waco and the like and can be placed in suspension during the synthesis process. Since the electrolytic performance of the oxides will partially superimpose the performance of the polyaniline, they can work together. The electrical conducting capability of the polyaniline comes along with its redox capability, and therefore there is no dead weight as in the Carbon and/or plasticizer used in Lithium ion batteries or other supercapacitors. This feature can improve the specific energy calculation. It is also possible to co-synthesize oxides of e.g. Manganese and Vanadium from their Sulphates along with the precursors of polyaniline or polypyrrole etc. Expanded voltage range can be thus achieved by superimposing the redox characteristics of both types of materials. Typically, the polymer establishes the morphology, and the oxide forms on the surfaces of the polymer.

The reaction can be readily completed at room temperature, e.g., about 20° C., although other temperatures can be selected as well to optimize yields, reaction times or control polymer growth. The pH of the solution should be controlled for consistency. The pH can be optimized for the specific reaction and is generally less than 6.0. In one example, a pH of about 1.8 can be used. In general, a pH between 1.2 and 1.8 can be used.

The product produced by the method can then be used directly to make the finished product or can be subjected to further processing. Preservation of the Oxidation state of the film is advantageous. For example, the method can further comprise a washing and/or drying step. Washing can be accomplished by passing the support through a low pH water solution, electrolyte solution or volatile organic solvent to preserve the level of film protonation. A preferred method of preparing the film for operation in a non-aqueous electrolyte is to use a hydrazine rinse. This rinse occurs at room temperature and causes a stripping of all growth related anions while providing for a fully hydrogenated, reduced film. This strategy allows for a most efficient transformation of the conducting polymer to switchable forms in the non-aqueous electrolyte solution. It also is purely chemical and does not require electrode application. By cycling the conductive polymer in a new, say lithium salt/PC solution, a new anion system can be established inside the polymer system. Drying can also be achieved by controlled application of convective or radiant heat between about 20 and 200° C. and through exposure to very low dew point dry air, or exposure to a vacuum.

The process can be preferably conducted continuously or semi-continuously. In such an embodiment, the reactants can be replenished into the solution continuously or semi-continuously. Where the first and second reaction zones are in liquid communication or in the same bath, the solution may be homogeneous.

In another embodiment, polyaniline nanowire electrodes are synthesized on base metals, and show stability in non-aqueous systems. Such polyaniline nanowire electrodes, when tested in non-aqueous electrolyte systems, demonstrate 1000 F/g of active material (F=Farad).

Typical Growth Solution and Conditions:
0.1 M Camphosulfonic acid; 0.1 M p-Toluenesulfonic acid; 0.45M Aniline in DI water. Growth is achieved at 25 degrees C., with CV between −0.2 and 1.2 Volt vs. Ag/AgCl reference at 300 my/sec for one cycle. Then PS for about 2400 seconds at 0.75 Volt vs. Ag/AgCl reference is performed. The working electrode can be Titanium, Aluminum, Nickel, Stainless steel, Silver, Platinum or Gold, graphite covered aluminum being preferred. The counter electrode can be Nickel, Stainless Steel, Platinum or Gold, stainless steel being preferred. The reference electrode can be SHE, Ag/AgCl, SCE, etc, Ag/AgCl being preferred.

The methods described herein can result in nanoporous growths having superior properties and characteristics. Conductive polymeric nanowires can be readily grown in equal parts Aniline and strong acids. It is found that greater stability is afforded in the disclosed mixture: The preferred synthesis solution has one part Aniline to the sum of the CSA and p-TSA to optimize the morphology, redox activity and stability of the film. The selected concentrations are 0.45M monomer/0.1 M pTSA/0.1M CSA in a water solution. Another preferred solution contains only CSA at 0.2 M and aniline at 0.45M (0.45 M aniline is essentially a saturated solution). In one example, nitric acid or another strong acid can be used to adjust the pH of the solution to about 1.3. The CV/PS combination also provides greater adhesion which is important to subsequent processing.

Product Characteristics:

The products formed by the process can be characterized as having a very high surface area and are highly porous, as evidenced by visual inspection, as below. The polymers are nanowires or nanofibers in that the diameters of a substantial number (e.g., at least about 50% and more preferably at least about 70%, such as at least about 90%) of strands formed thereby are less than 1 micron, preferably less than 500 nm and more preferably less than 200 nm. The pores and interstitial spaces formed by the nanowires are relatively large, in comparison to the fibers, the diameters of which are often 4 times or more the diameter of an adjacent fiber.

The polymers are conductive to the surface of the electrode and possess good to excellent adhesion properties. The surface area of the structure can be measured using nitrogen absorption, as is known in the art and can be preferably at least about 200 $m^2/g$, such as at least about 500 $m^2/g$, or more preferably at least about 1000 $m^2/g$. Maximizing surface area improves ion capture when the polymer is in contact with an electrolyte solution. For example, the polyaniline electrode made in accordance with the method above can produce about 4 volts in an organic solvent containing 1 M lithium salts when mounted opposite a suitable Lithium or Lithiated metal electrode such as Aluminum or Tin. In an aqueous electrolyte solution, a 2 volt cell can be produced with the polyaniline electrode on each side of the cell.

Figure 4:
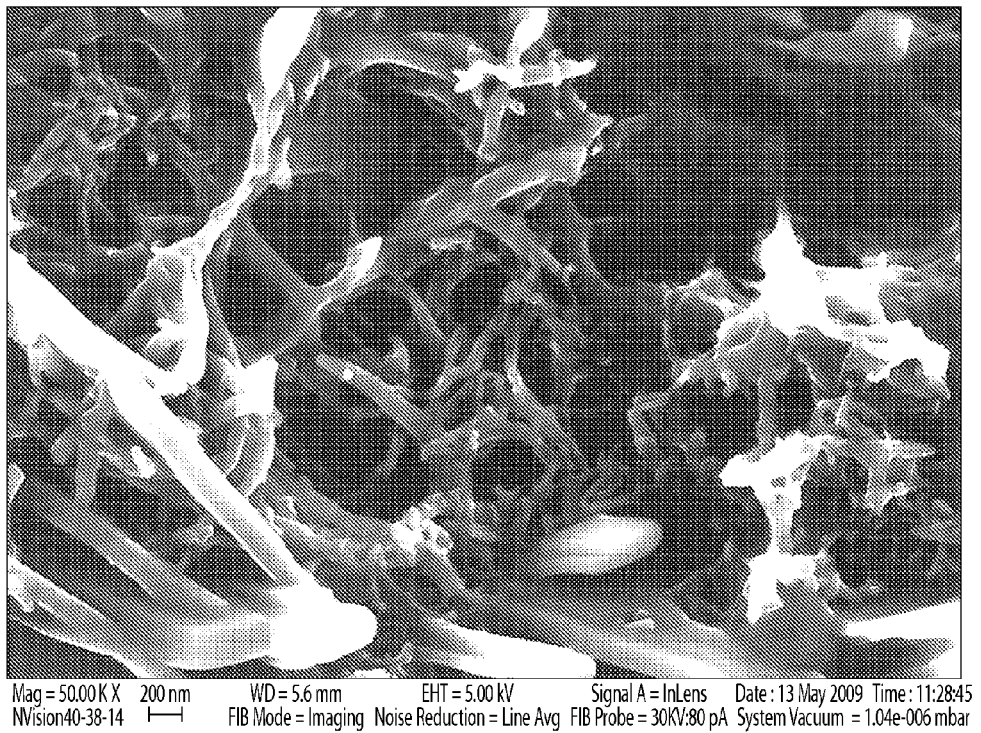
FIG. 4: Electron micrograph image of nanowire product.

FIG. 4 illustrates the nanowire and highly porous nature of the product.

Good adhesion is defined as a film that continues to operate without degradation over thousands of use cycles (see operating curve below showing up to 25,000 cycles of polyaniline operation without degradation).

Lithium ion batteries, with positive electrodes of Lithium inserted Cobalt, Iron Phosphate, $MnO_2$ etc. for comparison can operate for hundreds to low thousands of cycles with up to 30 percent degradation. The TEM above is typical of the delicate nano-structure of stabilized Polyaniline.

The products of the invention have good to excellent resistance to cycle degradation. The products are resistant to cyclic voltammetry testing. Resistance can be measured by immersing the polyaniline sample in a half molar solution of Lithium salt, such as $LiBF_4$ in 50% PC/AN electrolyte, and cycling between its operating voltage of −0.2 and 0.9V re. Ag/AgCl at 1000 my/sec scan rate for 5, 10, and 20K cycles. The products of the invention are characterized by less than 10%, preferably less than 5%, degradation or current loss over 2,000 (preferably over 5,000 or 10,000) cycles applying a voltage potential of 50 mV/sec, such as 100 mV/sec, or 1,000 mV/sec. The percentage degradation can be calculated by determining the difference in the areas under the curve before and after the stress tests are conducted.

The improved properties of the products described herein are due in part to the homogeneous deposition of acid groups, e.g. sulfonate groups, along the polymer structure. Thus, the invention provides for electrodes comprising a support comprising a conductive material and a conductive polymer, characterized by a sulfonate concentration within 1 micron (preferably within 0.5 microns) of the support surface that is essentially the same as the sulfonate concentration within 1 micron (preferably within 0.5 microns) of the electrode surface. "Essentially the same" concentration is intended to mean herein that the sulfonate to monomer ratio at the two loci is within about 50%. Thus, if the sulfonate to monomer molar ratio at the surface is about 0.5:1, then the sulfonate to monomer molar ratio at the support is between 0.25:1 to 1:1.5. In another preferred embodiment, the sulfonate to monomer ratio at the surface and at the support (within 1 micron, preferably within 0.5 microns) are both approximately 1:1.

In order to preserve the level of dopant anions in the film electrode during transfer out of the aqueous growth solution and into the organic electrolyte, the film is left in the fully charged state. This is characterized by a dark green color, and represents full oxidation. Although the large anions leave the electrostatic attraction of the polymer during discharge, they are physically trapped unless they are inadvertently washed away during the transfer process. It was found that a fully charged film would provide greatly enhanced cycling endurance once transferred into organic electrolyte. Another and most preferred strategy is to strip the anions from the film while preserving the level of hydrogenation by using a 5% Hydrazine rinse. In this condition, the conductive polymer is stable chemically in the reduced state and is white or cream in color. A high percentage of the repeat units are now available to be made electrically active in the new anion system provided by non-aqueous electrolyte solution.

Manufacturing Improvements:

During the polyaniline growth in the aqueous growth bath, the nanowire structure is fragile and subject to damage. In order to minimize the risk of damage to the growing film, care should be taken in the handling of the film as it travels through the growth bath. Potential damage to the film can come from contact with the guiding/turning rollers, contact with the electrode plates, induced surface shear from fluid flow and normal (pressure) forces on the film. The mechanical design of the growth tank preferably accounts for all these possible modes of film damage over the entire operating range. During normal operation, the film can be traveling at a speed of 10-20 cm/sec, and the design can also handle zero speed conditions and start up/speed up and stop/slow down transitions without damage to the films. To accommodate these design requirements, a number of design approaches are preferred.

First, guide rollers or turning bars can be used to change the direction of the film in the growth bath. For a single layer growth, either horizontal or vertical, the guide rollers are used to direct the film from the external source, down into the growth medium, through the electrode plate path, and then back out to the film exit. A basic vertical arrangement uses at least one guide roller in the growth medium, and a basic horizontal arrangement uses at least two guide rollers in the growth medium. In both cases, vertical and horizontal, the external routing of the film into and out of the tank will also typically use guide rollers.

Typical film tensions will be in the range of 2-10 N (0.4 to 2.2 lbs) and this tension can be maintained at all times during the manufacturing process, and all film speeds from stationary to maximum velocity. The film tension can be maintained by components external to the growth tank such as core shafts, pneumatic shaft brakes and clutches, tension sensing rollers and closed loop tension controllers. Nimcor and Montalvo supply such equipment. During normal processing speeds, the film can be pulled into the tank, around the guide rollers, through the electrode field plates and back out of the tank. While the tank design illustrated herein has been for horizontal processing of the film between horizontal field plates, vertical designs can be used as well.

While the film is pulled around the guide rollers (FIG. 19), there is risk of damage to the film surface through a skidding contact (differential motion) of the film against the roller surface. There are several ways to minimize the risk of this type of damage. Even though the substrate and growth structures are very thin, when the film is pulled around the roller, the neutral axis for bending will exist close to the center of the film and the inner surface (surface facing the roller) will compress and the outer surface will be placed in tension. This compression as the film is pulled from a straight condition into a curved state will cause some relative motion of the film surface against the roller surface. This motion can be minimized by making the roller diameter very large compared to the film thickness. The guide rollers are typically in the 75-100 mm diameter range to help minimize this relative motion of the film surface compared to the roller surface and neutral film axis. A more important source of differential motion is caused by differences in motion between the film and the surface speed of the roller. The rotation of the roller can be driven by the motion of the film through shear stress, or the roller can be driven by an external source such as a motor. In the case where the roller is driven by an external motor, a control and drive system can be built to match the roller velocity to the film velocity, but small variations due to control errors will always be present, especially during periods of velocity change were the film is either speeding up or slowing down. Even if the roller and film are driven by the same motor drive, rotational inertia and drive backlash conditions can cause momentary velocity differentials. In the case where the film drives the roller speed, there can be an induced shear force on the film surface to transfer the required torque to overcome the bearing and fluid drag on the roller. During a velocity change, the shear force between the film and the roller will also have to account for overcoming the rotational inertia of the roller. Very slow acceleration and deceleration can be used minimize this induced inertial drag on the film surface, but this leads to long transition times which can make controlling the growth process between the field plates very difficult.

Figure 19:
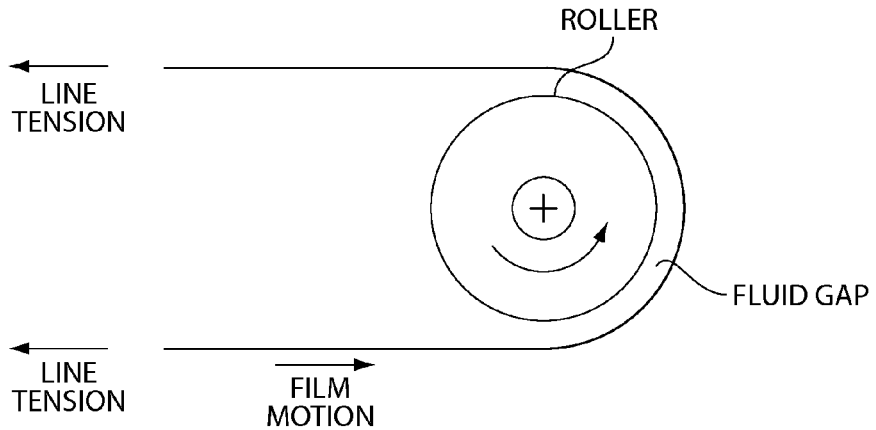
FIG. 19: Illustration of a guide roller of the invention with a film pulled over it. The line of tension is illustrated together with the preferred fluid gap.

A better solution to minimizing the surface shear on the film and to eliminate the risk of a differential skidding motion is to create a fluid layer between the film and the roller surface. FIG. 19. This fluid layer can support the film, preventing contact to the roller surface and due to the low viscosity of the aqueous growth solution, velocity differentials between the film and roller will create only very small shear forces on the film surface. At running speeds, it may be possible to use entrained fluid on the roller to produce this fluid layer, but for protection over the entire operating film speed range, the fluid film is maintained using an external mechanism. By pumping fluid through the roller surface from the roller inner diameter to the outside, a fluid film can be maintained, even at zero film speed. Also, by doing this, the rate of pumping can be controlled to accommodate varying film tensions.

For a given line tension T, the preferred pressure to produce a fluid gap can be estimated using the following equation:

$$2 \cdot T = \int_0^\pi P(\theta) \cdot w \cdot r \cdot \sin(\theta) d\theta$$

where P is the local gap pressure, w is the film depth into the page and r is the roller radius. For a simple initial calculation, one can assume that the pressure is constant around the circumference and the equation becomes:

$$2 \cdot T = 2 \cdot P \cdot w \cdot r$$

or $$P \sim \frac{T}{w \cdot r}.$$

Thus, for a 10 N tension with a 20 cm wide film on a 75 mm diameter roller, the preferred pressure would approximately be 667 Pa (0.1 psi). These low pressures are very easy to establish and minimize the differential pressure across the film as well.

Figure 20:
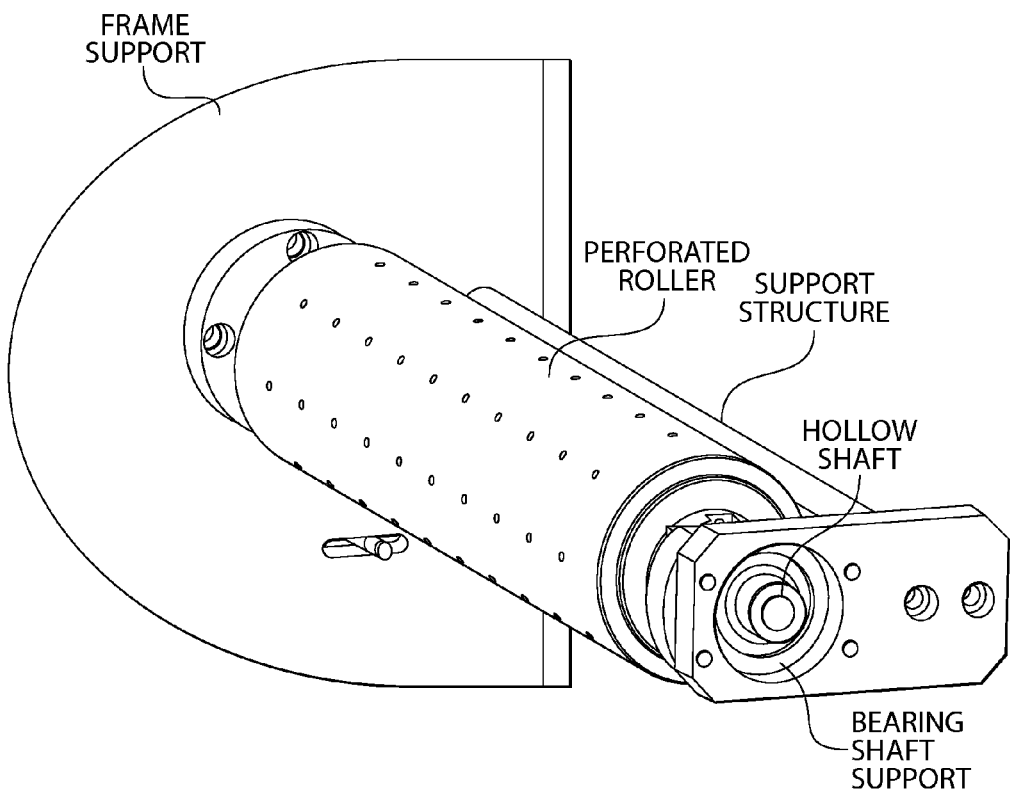
FIG. 20: Illustration of a perforated roller that can be used to minimize shear forces during processing.

A system has been designed that incorporates a perforated roller onto a driven hollow shaft. Fluid is pumped into the hollow shaft through rotary unions. This fluid then enters the inner diameter of the roller and exists through the holes in the roller shaft. An isometric view of this roller is shown in FIG. 20. In a preferred embodiment, the fluid is a reaction medium.

The guide rollers described herein can be used in other methods for transporting fragile or thin sheets of material through liquid or fluid solutions.

Figure 21:
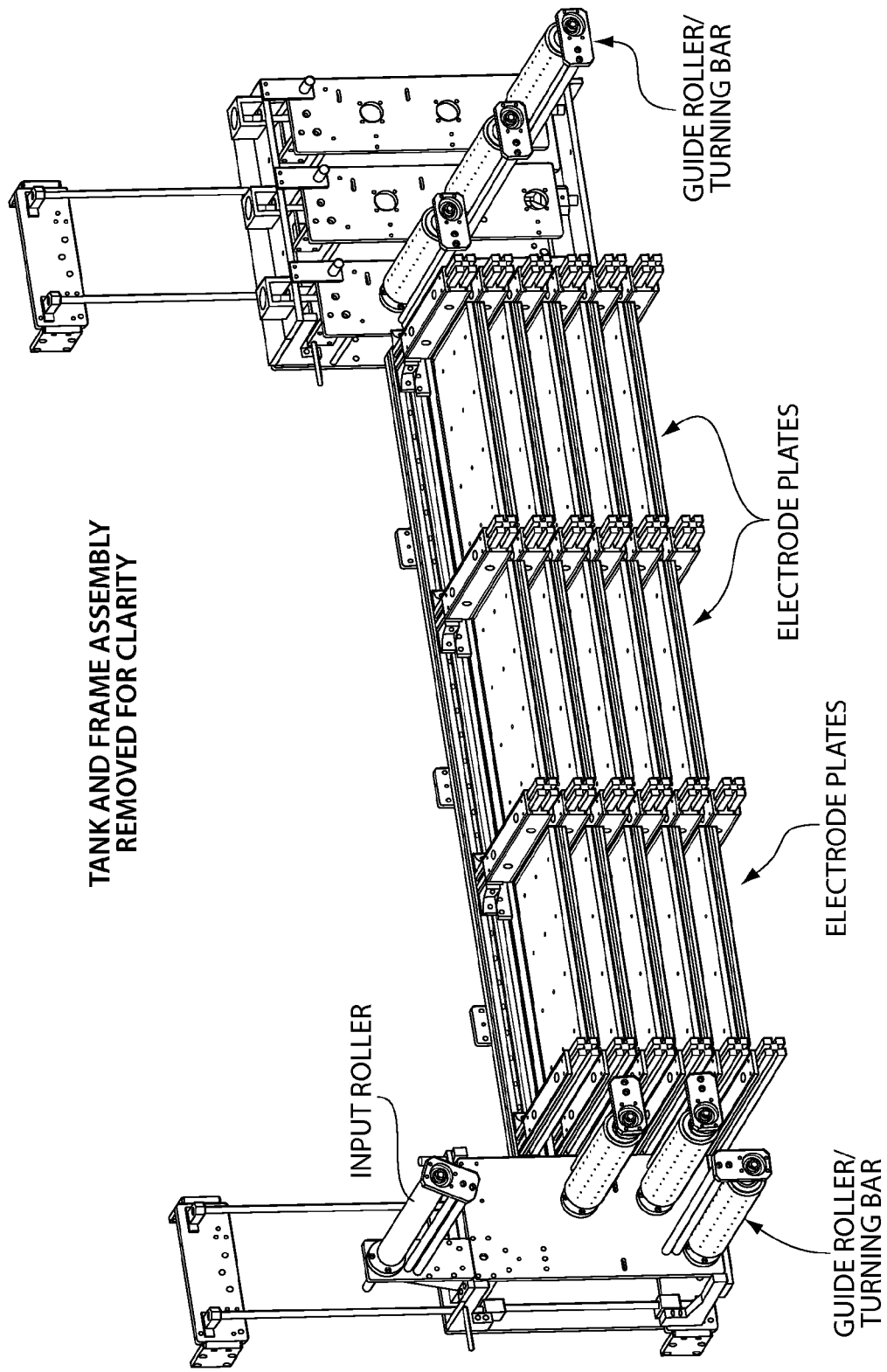
FIG. 21: Illustrates an assembly wherein 5 layers of electrode plates (3 per layer) are assembled with guide rollers for directing a film to each layer.

The electrochemical growth tank can employ one or more potential electrodes. Preferably, the process employs plates with multiple potentials for initiating, growing and conditioning the polyaniline structure. Use of multi-potential electrodes will facilitate a continuous roll fed foil system. FIG. 21. Further, the electrodes can be configured serially and/or stacked. Preferably, the process employs rows of horizontal electrodes stacked in vertical series. The low shear roller structures allow the foil or film to be wrapped back and forth within a single tank and reduce the total line length significantly. Each electrode in a horizontal set can be at the same or different potential and each vertical series can also have the same or multiple potentials.

In a batch process, there is a single electrode to which different potentials or current conditions can be applied in order to obtain the desired result. In this case, the operating conditions can change with time and can include constant voltage, constant current and constant power operation. With a continuous foil process, time varying conditions on a single electrode or set of electrodes is not optimal. Instead, the system preferably uses a series of electrodes at different conditions that the foil is pulled past. By changing the conditions from one plate to the next, an effective time varying condition can be applied to any fixed point on the film.

FIG. 21 shows a system with layers of electrodes, in which there are three separate sets of electrode plates per layer. Each set of plates consists of an upper and lower plate such that both sides of the film is exposed to the same potential. The electrodes are preferably electrically isolated from each other. They can all be connected together externally in order to be run at the same operating condition, or each set can be run at an independent operating condition. FIG. 21 illustrates a device where a film can be fed past the input roller, around the guide roller between a first set of electrodes, between a second and third set of electrodes configured in a horizontal series, exit the electrode set under and around a second guide roller and back through a set of three serially configured sets of electrodes. These sets of electrodes are configured vertically above the first series of three sets of electrodes. The film can then exit the assembly to under and around a third guide roller and back into a third series of three sets of electrodes and so on. Five layers of three sets of electrodes is shown. FIG. 21 also illustrates the tank and frame for the electrodes.

The length of each electrode set can be consistent between sets or can vary from set to set. For a given foil speed, a series of short electrodes sets spaced closed together can be used to produce a rapidly time varying voltage or current condition. Long electrode sets or multiple sets that are electrically connected can be used to produce time constant voltage or current conditions. The size of the gap between the electrodes in a set can be varied depending on the film speed, size and length of a single layer. For a given film tension, the film cannot be allow to contact the electrodes, so as the length of the single layer increases or as the density of the tank fluid decreases or as the thickness of the film increases, the size of the electrode gap preferably increases to accommodate increased dropping of the film. In general, a 10 mm gap will handle all possible film/fluid/tension operating conditions. Making the gap too large will negatively impact the size of the overall system as well as increase potential electrode edge issues in terms of a degraded electric field in the growth fluid.

The gap between successive sets of electrodes is dependent on the fluid properties (resistance/length) and the electrode potentials. As the conductivity of the fluid increases, or as the electrostatic potential between successive sets increases, the minimum allowed gap between the sets preferably increases to prevent excessive leakage effects from one set of electrodes to another. Even for conditions where there is a single potential to be applied to the electrodes, the system is preferably split up to a series of independent electrode sets that are independently controlled. As concentrations of chemicals and salts vary, the effective potential of an electrode set compared to the local film can vary. In order to keep the local electrode set at the correct potential, a reference electrode may be used to account for varying fluid conditions. Especially in cases of very long layers at a single potential, the local reference can be used to keep a tight tolerance on the effective electrical potential and the system can be broken down into a series of independent electrode sets that will run at similar, but not exactly the same, potentials.

Another factor that may benefit from the separation of the electrodes into multiple sets is the grounding requirements of the conductive film. As the film travels through the tank and is either plated, or has a polyaniline structure grown on it, an electrical current is passed into or out of the foil, depending on the operating conditions. This accumulated current must complete the driving circuit and be conducted to the opposite power supply terminal from the electrode set. This requires a regular mechanical/electrical connection from the film to the power supply terminal. As the current flows through the foil to this common collector point, the current flow will induce a voltage potential in the film. If the distance along the film between successive collector points is too high, then the induced voltage drop can be high enough to start to affect the plating or growth process. For example, if you have a 10 micron thick aluminum foil (1145 alloy, for example), that is being subject to a constant current state of 1 mA/cm$^2$ per side with a total length between grounding points of 1 m, then the maximum potential difference along the film will be approximately 7 mV. If the current or the length is doubled, then the maximum potential difference along the film will be 14 mV. If the process requires a voltage potential variation limit of 10 mV, then the first instance may be tolerated, but the second would require breaking the electrodes into multiple sets with film grounding in between the sets.

Another benefit to breaking the electrodes into sets is to allow for multi layer tank structures. For a required residence time of a foil in a plating or growth potential, the required wetted length of the electrodes is a given. For example, a required residence time of 2 minutes for a film traveling 10 cm/sec will require a total wetted electrode length of 12 m. For a single layer approach, this would require a tank of 12+ meters in length. By breaking the electrodes into sets and then stacking multiple layers of sets in a single tank, the overall tank length can be reduced significantly. If the previous example is broken into 4 layers, then the total layer length would be 3 meters and the tank might be 3.5-4 meters total. Due to the very delicate condition of the polyaniline in the aqueous state during the growth process, this can be facilitated by using the low shear guide rollers/turning bars described above.

Two electrodes composed of polymer synthesized as described above can be mounted opposite each other, separated by electrolyte and a semi-permeable membrane in order to make an electrolytic super-capacitor. For example, the ribbon electrode can be cut into shapes facilitating assembly. One example is the use of laser cutting that includes the forming of an outer shape and the electrode contacting hole or spacer. Material including the punched sprocket holes can be retained or discarded after trimming. A vacuum handling device can be used limiting contact to small portions of the electrode sheet.

An example of an assembly is enclosed where sheets of electrodes are separated by semi-permeable membranes. The sheets are wetted with an electrolyte mixture, for example, by air-free atomization or submersing the electrodes into an electrolyte solution. Air-free atomization can avoid the use of vacuum filling techniques that can harm the nanostructures. The electrolyte easily wets through the semi-permeable membrane and into the polymer electrode, controlling excess fluid.

In the case of a product with opposing polyaniline electrodes, aqueous electrolytes can be used. Such products can operate between 0 and 2 volts, for example. The electrolyte solution can be an ionic liquid, e.g., a room temperature ionic liquid such as 1-butyl-3-methylimidazolium chloride, sulfuric acid, potassium hydroxide, sodium hydroxide, propylene carbonate, dimethoxy ethanol, diethyl carbonate or acetonitrile. As further examples, the liquid may include $LiClO_4$, $NaClO_4$, $LiAsF_6$, $LiBF_4$ or quaternary phosphonium salts.

In the case of higher voltage operation (e.g., 4 volts) using polyaniline and Li/Al requiring high breakdown field operation, electrolyte solutions such as propylene or ethylene carbonate/dimethoxyethane (PC/DME, such as 50/50 PC/DME) and Lithium salts such as $LiBF_4$ can be used. Additionally, a large negative electropotential material can be selected as the opposing electrode. As is typical for a Lithium ion battery, a Lithium based negative electrode can be used. Lithium ions can be inserted into Carbon or Graphite which results in an electrode of about −3 Volt. Lithium ion batteries suffer from overheating and sometimes explosion due to the use of over −3 volts conditions during charging. Since −3 Volts represents a decomposition Voltage for Propylene Carbonate as well as other organic electrolytes, it is desirable to find a safer negative electrode if possible.

The inventors discovered that safer negative electrodes can be made by inserting lithium into an aluminum electrode. In this embodiment, aluminum, and alloys thereof, can be selected as a Lithium ion insertion material since its alloyed electro potential is about −2.7 Volts, well within the "safe organic electrolyte operating window." The aluminum is preferably a magnesium containing alloy. The alloy is lithiated by flowing a reducing current (e.g. 5 ma/cm$^2$) in a preferably moisture free organic electrolyte containing a Lithium salt such as LiSO4, $LiBF_4$ or $LiClO_4$. The lithium salt is preferably maintained in a solution of at least about 0.5M, preferably about 1 Molar solution. An organic solution, such as PC/DME as above can be used. The dried Aluminum can be lithiated as described above or by physical application with an air insensitive Lithium compound such as SLMP (Stabilized Lithium Metal Powder) from FMC Corp. In the latter case, the Lithium is alloyed into the Aluminum by rolling or contacting with electrolyte solvents. As specified by Melendres in U.S. Pat. No. 4,130,500, which is incorporated herein by reference, Magnesium can help physically stabilize Aluminum film during the swelling and shrinking phases of Lithium insertion and removal, respectively.

Specifically, an alloy composition of about 1, preferably 2 atom percent magnesium to 20 atom percent magnesium and aluminum can be used. At least 3 atom percent magnesium can assist in maintaining structural integrity during electrical discharge when the lithium atoms migrate to the electrolyte. Examples of specific Aluminum alloys include 5083 and 5052. Since the magnesium does not enter into the cell reaction, it appears to serve in interstitial or substitutional solid solution as a bonding material for maintaining a matrix structure into which the lithium can be repeatedly charged. Magnesium concentrations are preferably less than 20 atom percent. Specifically, an alloy composition of about 2 atom percent magnesium to 20 atom percent magnesium and aluminum can be used. At least 3 atom percent magnesium can assist in maintaining structural integrity during electrical discharge when the lithium atoms migrate to the electrolyte. Examples of specific Aluminum alloys include 5083 and 5052. Since the magnesium does not enter into the cell reaction, it appears to serve in interstitial or substitutional solid solution as a bonding material for maintaining a matrix structure into which the lithium can be repeatedly charged. Magnesium concentrations are preferably less than 20 atom percent. As noted in the literature (e.g. Schleich et al, J. Power Sources, 2001) the thinnest aluminum samples were less damaged in electrochemical tests. The micro-porosity created as a result of the etch (described elsewhere) yields a similar result by improving the ionic access to the film which in turn improves the cycling capability of the Li/Al alloy. In the etched aluminum film, the thinner walls (compared to a monolithic aluminum sheet) allows the aluminum to expand and contract with less damage. The source of the improved performance is thought to be a reduced concentration gradient within the electrode.

Lithium is added to the aluminum-magnesium alloy in concentrations of about 5 to 50 atom percent. Lithium is preferably added to the magnesium-aluminum alloy electrochemically. This can be performed as the initial charge within an assembled cell having sufficient reaction product, e.g. a lithium sat or chalcogenide, to provide lithium into the negative electrode composition. Lithium and aluminum can also be mixed in a powder form and rolled into a foil, and annealed at 500 degrees C. for use.

Platinum can be used as the counter electrode (Ag/AgBF4 in PC/DME is can be used as the reference electrode in the organic electrolyte). An excess of Lithium is inserted to the Aluminum to achieve a −2.7 volt electrode (usually between 2-50% Molar content). The amount can be optimized for the desired final current.

Figure 5:
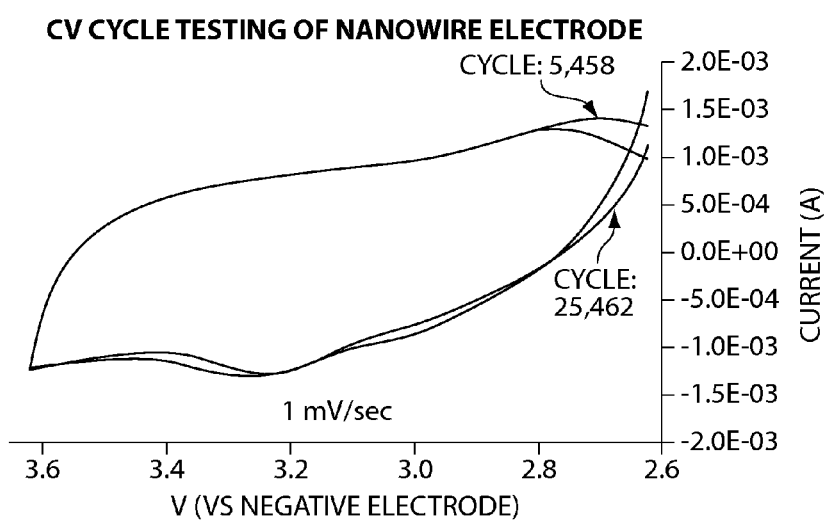
FIG. 5: CV cycle testing of nanowire electrode.
Figure 6:
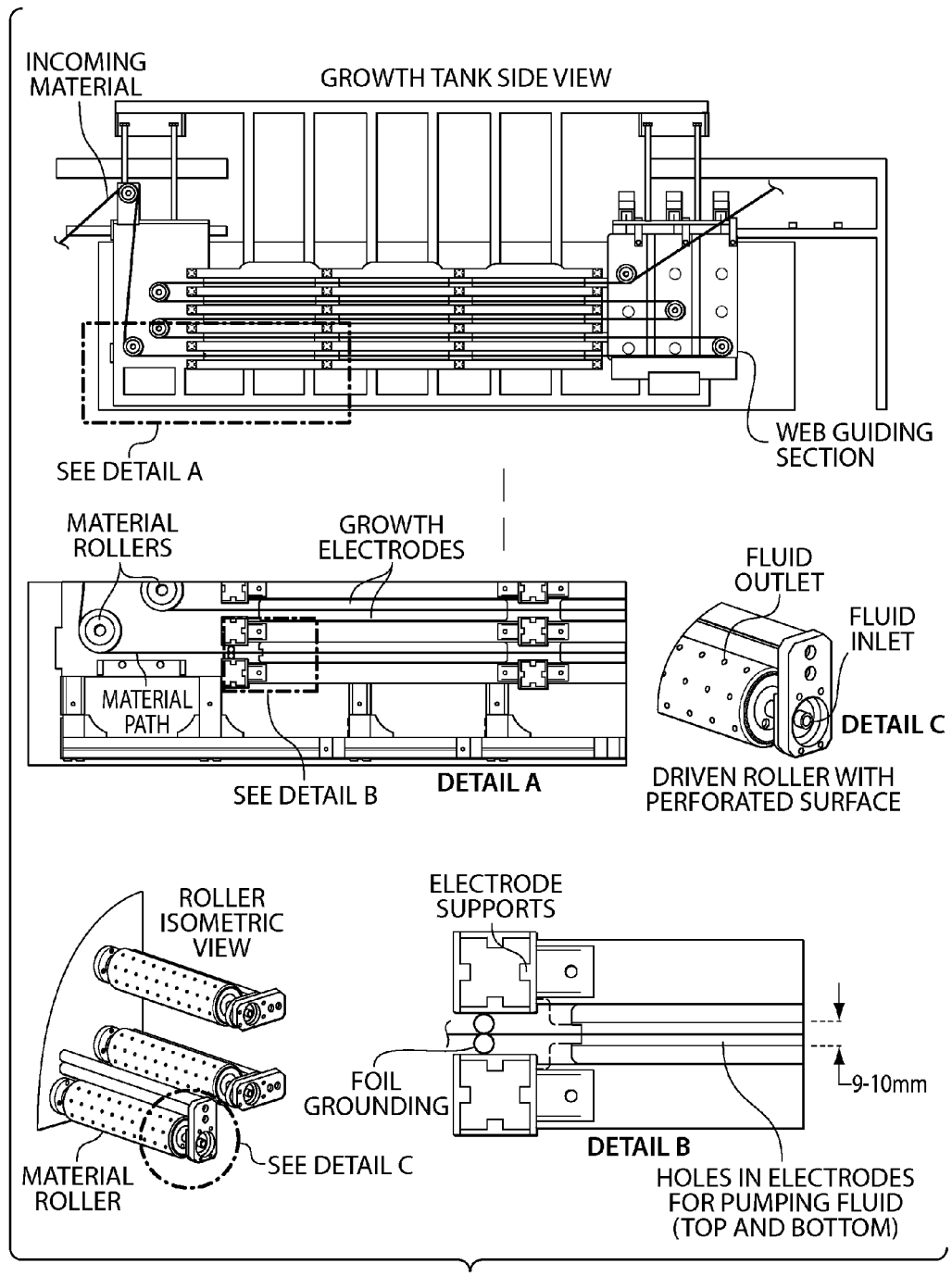
FIG. 6: Manufacturing scheme.

Although Lithium alloyed or amalgamated Aluminum is less sensitive to moisture that Lithium metal, low moisture conditions such as −40° C. dew point air or Nitrogen gas are preferably used after the Lithiation process. In order to increase the surface interaction sites, the Aluminum can be electrochemically roughened or etched in 1 M HCl, 5% ethylene glycol at room temperature with an oxidizing current of at 0.02 A/cm$^2$ to form a very high specific surface area electrode which increases its current capability. Alternatively, the etch is between 10 and 30 seconds at 80° C. Three minutes at room temperature is most preferred in order to provide the necessary surface area without weakening the substrate. The substrate is now dried at elevated temperatures of 80 to 120 degrees C. in dry air. In this way, a hybrid super-capacitor can be made with up to a 4 Volt or so operation (e.g. −2.7 volt Li/AL plus 0.9 volt Polyaniline=3.6 volt operation) as illustrated below (FIG. 5) for a representative electrode system.

In another embodiment, a high surface area lithium-aluminum electrode is prepared by electrochemically etching an aluminum alloy employing an HCl-ethylene glycol solution. Examples of aluminum alloys include, but are not limited to, the 5xxx series, containing 0.3-5.0% magnesium.

The ribbon electrodes are advanced continuously through the pre-treatment, growth, etch or Lithiation baths before going through the drying tunnel. The drying tunnel simply applies a ramped heating in air at between 20° C. to 200° C. gradually, to eliminate water from the material. Alternately, drying can take place by immersion in organic solvents, and then dried as above. The simple, rinse free drying leaves behind a certain beneficial level of acid salts as a further source of dopant to the film.

Improvements have also been made to the drying step of the process. Drying the incoming material (+substrate, −substrate and film layer) is important to minimize the introduction of moisture into the final assembly area and into the final package. Since both the polyaniline structure and the negative substrate are treated in aqueous solutions, there is a significant amount of moisture that has to be driven off without damaging the films. In order to do this, the materials can be passed through an infrared (IR) heating oven with a preferably counterflowing dry air/gas stream. Cross flowing streams can also be used. Use of long IR (2-10 micron) heaters helps to prevent damage to the grown polyaniline structure which is sensitive to degradation from visible light. Also for drying the etched aluminum substrate, the use of long wavelength IR will focus the energy on the resident water rather than the aluminum surface, which is highly reflective of long IR. The counterflowing dry air/gas helps to prevent the evaporated water vapor from entering the final assembly area and increases the drying rate compared to IR heating in ambient conditions. Reducing the gap size around the foil helps minimize the required volume of dry air/gas and results in a higher counterflow velocity for a given flow rate of air.

In one embodiment, a pair of IR lamps are mounted with their emitting surfaces facing each other across a small gap (10-20 mm). The lamps are mounted into a frame assembly that has aluminum panels mounted on the outside to create a sealed volume with either one or two entry gaps for incoming/exiting foil material. If a single gap on one side of the tunnel is used, then discrete sections of material can be inserted, dried and then removed. If a gap on both sides is used, then film can be passed continuously through the tunnel. Each IR heater has an embedded thermocouple sensor and its own PID temperature controller. The operating temperature of each heater can be independently set. There is a port on the side of the tunnel to allow for dry air/gas entry.

Figure 22:
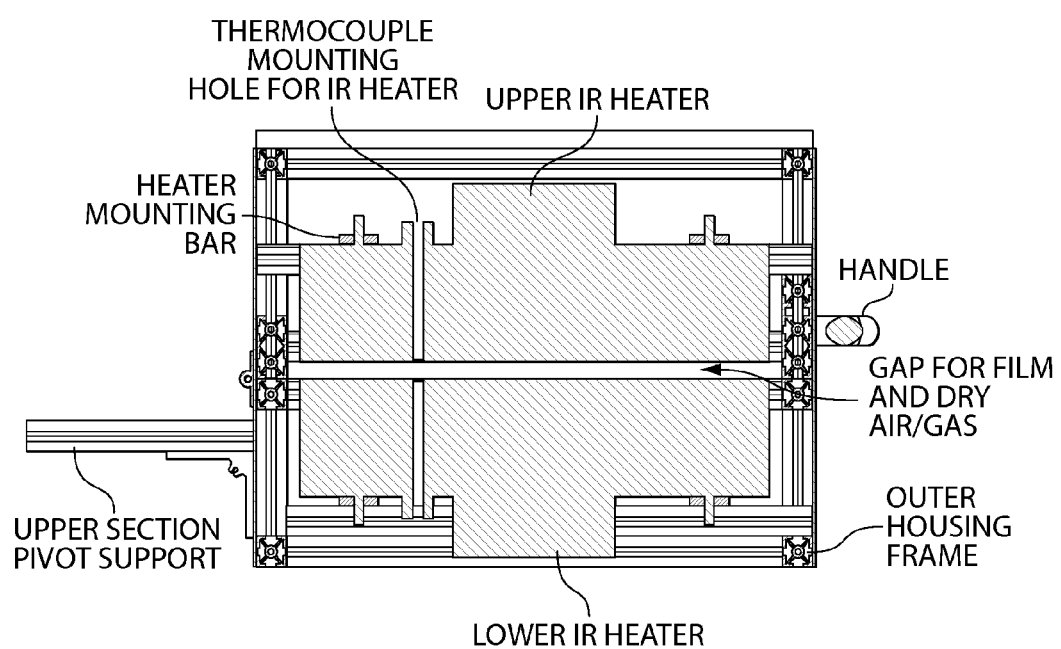
FIG. 22: Illustrates a preferred drying tunnel of the invention.

This small tunnel is sufficient for lab tests and basic development, but does not provide true counterflowing dry air/gas conditions. For the production line, the drying tunnel is the interface between ambient operating conditions and a dry air environment. The dry air environment can be kept at a higher pressure than ambient to prevent humid air and moisture from leaking into the dry air manufacturing volume. A narrow gap IR drying tunnel can have multiple heaters on the top and bottom (e.g., 2, 3 or more on each top and bottom) in an arrangement that can be optionally hinged open for loading the film into the tunnel and for access to clean the IR heater surfaces for maintenance. By putting multiple heaters along the length of the tunnel, the heaters can be set at different temperatures if a controlled ramping of the film temperature is needed. In the case of a wet polyaniline film, rapid heating of the water and the substrate may lead to damage of the film, including up to the ablation of the polyaniline from the substrate surface. Multiple heaters allow for the controlled ramping of the energy input into the films to help prevent this. Between successive heaters, a highly reflective surface is used to reflect/reradiate any incident energy. These surfaces can typically be polished aluminum or stainless steel sheets, e.g., 1-2 mm thick. The position of the IR heaters within a module is flexible and can be arranged to optimize the drying of the different films. If an unplated etched aluminum film needs to be dried, the heaters can be moved as far away from the film entrance as possible. This exposes the film surface to a period of dry counterflowing air before exposure to IR energy. This initial area of dry air will drive off some of the resident water. Since the oxidation rate of exposed aluminum is highly affected by the presence of steam vapor, it may be advantageous to drive off as much water from the film as possible before starting to drive up the surface temperature of the aluminum. For drying the polyaniline film, a gentle ramp up to temperature may be needed and multiple close spaced IR heaters with each successive heater having a slightly higher operating temperature may be optimal. Gap sizing is important to keep to a minimum to reduce the volume of counterflowing dry air and to raise the air velocity relative to the film. As the air velocity increases, the coefficient of convective heat transfer and mass transfer will increase, helping the drying process. Also as the dry air flows along the drying tunnel, it will pick up thermal energy from the emitters, reflectors and side walls. This increase in air temperature will help to increase the drying rate. FIG. 22 illustrates such a tunnel.

Both dry air and inert gases can be used for the drying process. In some cases where the film may be especially subject to oxidation or degradation from exposure to air, an inert gas such as $N_2$ or Argon may be used to maintain a stable gas layer around the film. Minimizing the gap size will help to reduce the required gas volume.

The modular drying tunnel may also be stacked in series to develop a more flexible drying station for various conditions. The modular drying system consists of series of drying tunnels in series with a guide roller assembly at the front and rear of the system. The tunnels can be stacked in direct contact to maintain an effective gas tunnel for the counterflowing dry air. The guide rollers are used to ensure that the film remains in the middle of the air gap in the tunnel. If required, especially on long tunnels, guide roller assemblies can be place in the middle of the drying tunnel system. The final set of guide rollers at the exit of the tunnel are enclosed within a dry air enclosure that will mate to the final manufacturing dry air volume. This volume will be kept at a higher than ambient pressure and this pressure will induce the counterflowing air stream through the drying tunnel. If a set of intermediate guide rollers is used, it also has to be placed within a dry air enclosure.

After drying, the ribbon electrode is cut into shapes facilitating assembly. Examples include the use of laser and mechanical cutting that includes the forming of the outer shape and the electrode contacting hole or spacer. Material including the punched sprocket holes can be discarded after trimming. A vacuum handling device touches only small portions of the electrode sheet. An example of an assembly is enclosed where sheets of electrodes are separated by semi-permeable membranes. The sheets are wetted with electrolyte mixture during assembly in this case. An air free atomization is used to wet the film sheets during construction to avoid the usual vacuum filling techniques that can harm the nano-structures. The electrolyte easily wets through the semi-permeable sheet into the polymer electrode, and excess fluid can be controlled. In the case of a low voltage product with opposing polyaniline electrodes, aqueous electrolytes can be used. In the case of higher voltage operation using polyaniline and Li/Al requiring high breakdown field operation, electrolyte solutions such as PC/DME and Lithium salts such as LiBF4 are used.

The Al substrate enters the tank on the left hand side and is routed to the bottom of the tank, and then routed back and forth over several layers while being pulled between multiple isolated electrodes. The gap between upper and lower electrodes is shown here to be 9-10 mm and the electrodes have ports for inducing flow of the aqueous solution along the substrate path. This fluid flow supports the film during growth, preventing contact with the electrodes and eliminating shear forces on the nanowire structure during growth. Similarly, shear forces on the nanowire structure where the substrate travels over the guide rollers can be eliminated by driving the rollers at line speed to avoid any velocity differential, and by pumping fluid through the hollow perforated rollers to maintain a fluid film between the rollers and the substrate. The substrate tension will be approximately 8 N and will require local fluid pressures of only 1.6 kPa (0.24 psi) to maintain a fluid gap between the roller surfaces and the substrate. This fluid pressure is easy to obtain through entrained fluid on the driven rollers and by pumping the aqueous solution through the perforated rollers. These steps are specifically done to minimize all shear and non-uniform normal stresses on the nanowire structure during growth.

Once the film with the nanowire structure leaves the growth tank, it will be pulled through a drying tunnel that uses incremental medium wavelength IR heaters and heated dry air (−40° C. dewpoint) to remove the moisture. Once dried, the nanowire structure is more robust and easier to handle without damage. The remaining steps and handling of the substrates will be through use of vacuum belts and vacuum grippers. Due to the very light weight, low tension forces and the large surface areas, very low levels of vacuum (<1.3 kPa, <0.2 psi) can be used for handling purposes. These very low, uniform pressures significantly reduce the risk of nanowire damage.

Figure 7A:
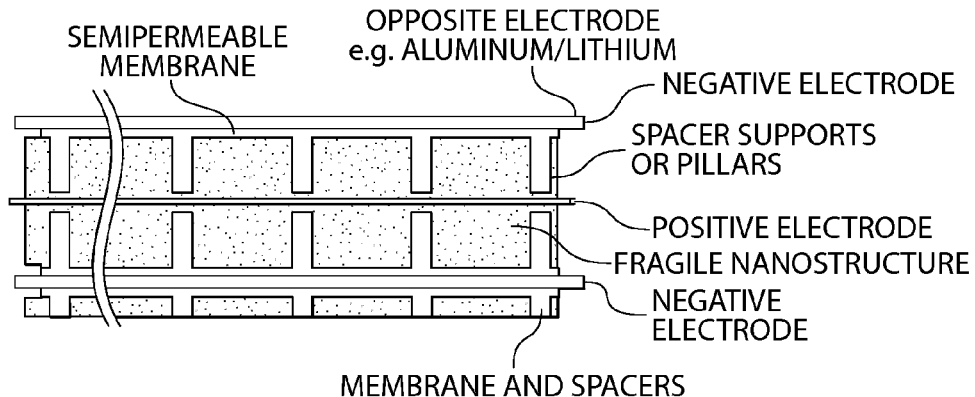
FIGS. 7A-7C: Spacer/layer positive and negative electrodes.
Figure 7B:
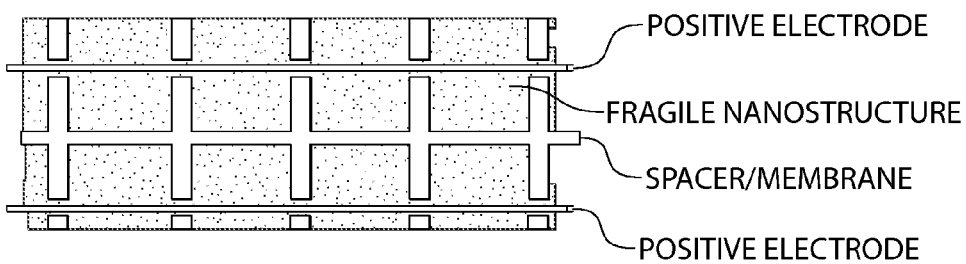
Figure 7C:
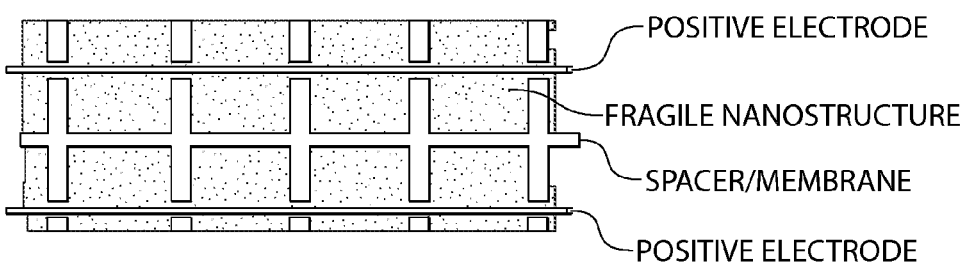

A semi-permeable membrane can be used to electrically isolate the two electrodes but allow ion transport (e.g. Li+ and $BF_4^-$) between the electrodes. Since the synthesized polyaniline formed from this method is brush or branch like, a separator may have periodic pillars or spacers incorporated to protect the film, as shown in FIGS. 7A and 7B.

The pillars (1-2% of the total area) incorporated onto the surface of the separator membrane crush into the film (not less than 4 microns thick) and establish support without sacrificing the remaining 98% or so nanostructures and their redox providing surface areas. In this way, force can be used to mount the various layers of the multilayered device without crushing or reducing the available surface area of the polymer nano-structured films. The lost area due to the spacer arrangement is about 1% and the spacers can be crossed lines, round or square shapes or other shapes that provide stand-off capability. The semi-permeable spacer or separator can be made of polypropylene, Teflon, poly carbonate, cellulose based or other materials. Not to limit the approach, but these can be pressed, etched, machined, ablated or molded. The materials can be purchased from e.g. Dupont, Celgard, LLC, etc. The films are then pressed under heat to form the pillar structures, and then expanded in the usual ways to provide the ionic transport capability. Another method for providing the pillars or supports is by printing dots or bumps of epoxy or other suitable material to the permeable membrane by using microgravure or direct ink jet methods. The permeable membrane may be treated with surfactant and other additives as known in the art.

Typical pressing conditions are 2000 psi at 180° C. and depend on the melting point of the exact material. Since the pillars only represent 1% of the area, even 25 micron pillars can be produced without losing even 1 micron of film thickness. The features are formed in a roller or calendaring technique. A second technique is the use of a salt electrolyte/plasticizer/filler to mold a working separator with pillars or spacers out of electrolyte containing compounds known in the art. A third way is to provide a separate spacer device combined with a semipermeable membrane, separately or attached. Typical compounds are EC, PC, DME, PVDF, TFE and the salts are typically $LiClO_4$, $LiBF_4$ etc.

Figure 8A:
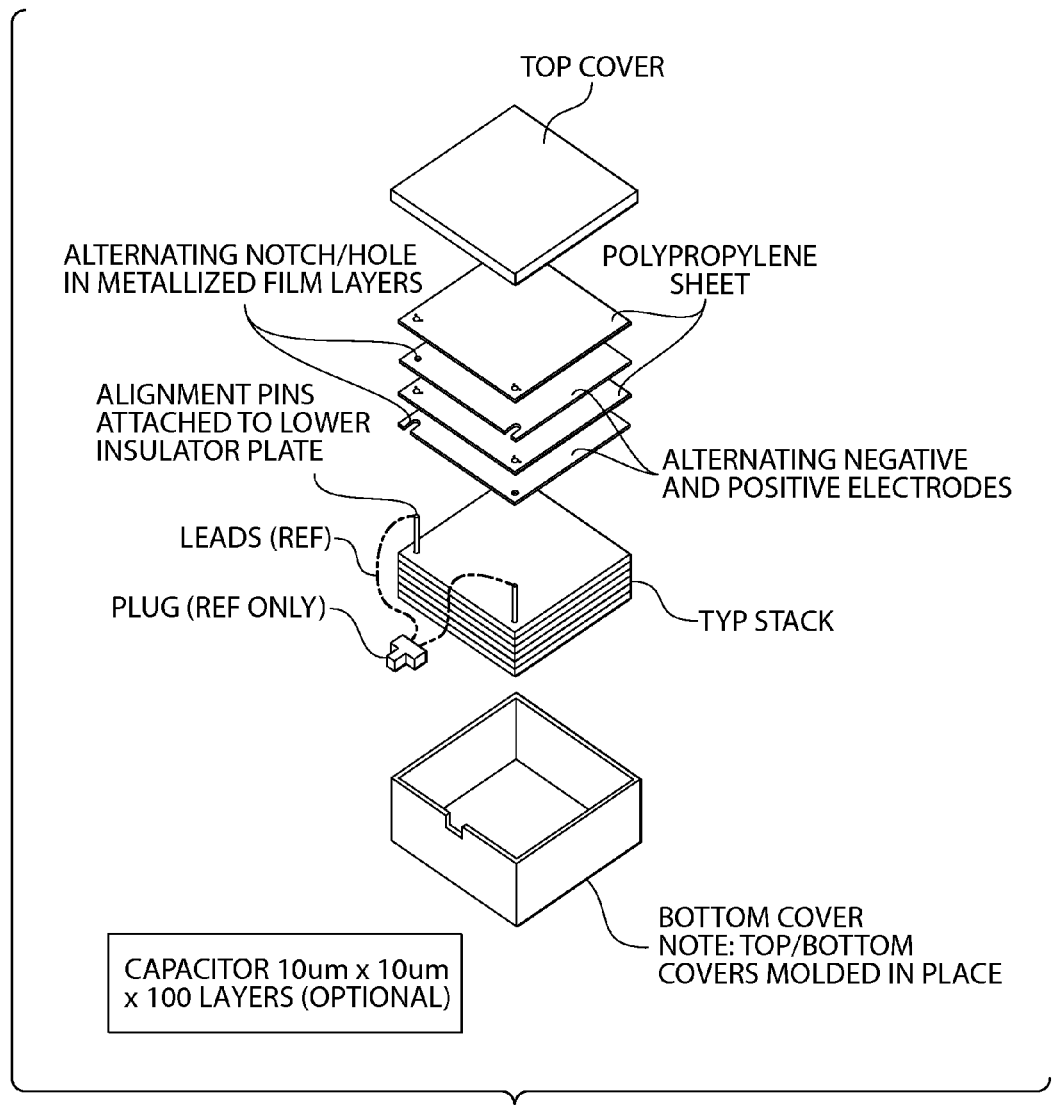
FIGS. 8A-8C: Stack of alternating electrode and spacer layers.
Figure 8B:
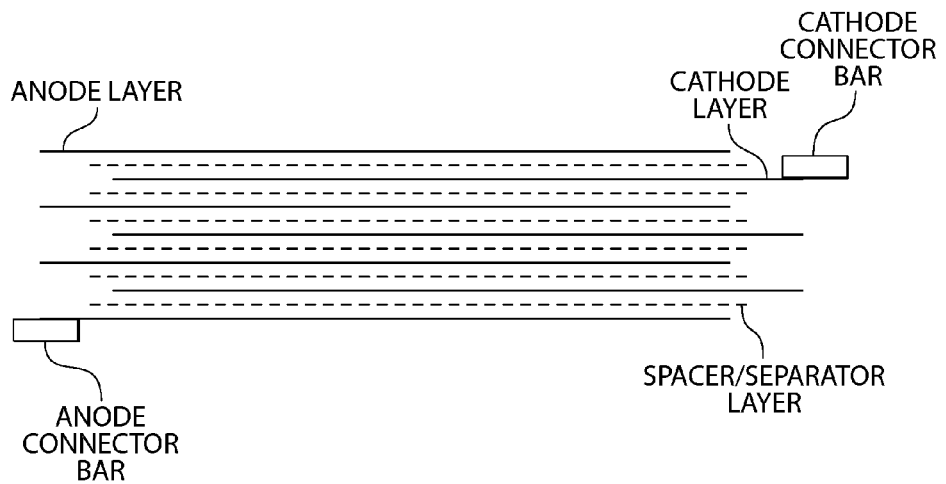
Figure 8C:
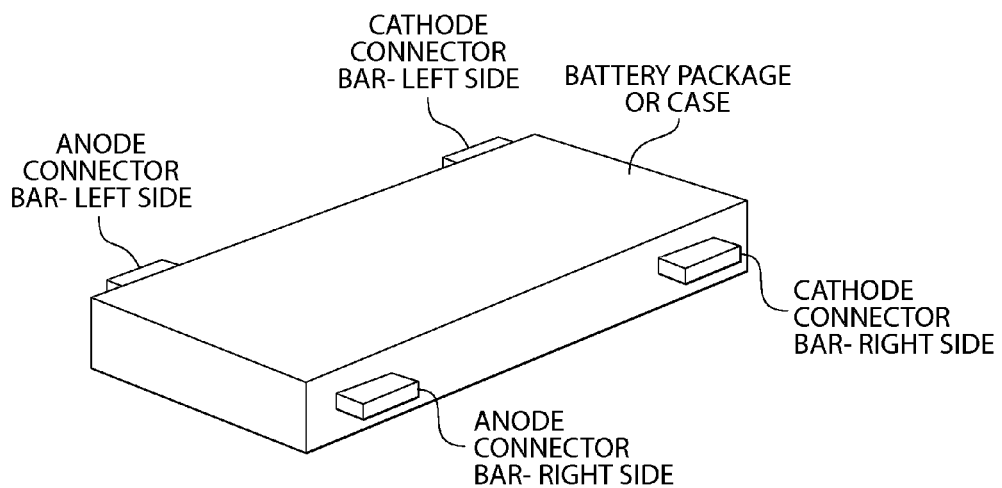

Alternating layers of cathodes and anodes are stack on top of each other with spacer layers that are electrically insulating but ionically conductive between each successive anode and cathode layers. Alignment is such that all the anode layers extend out of one side of the stack and all the cathode layers extend out of a different side of the stack. FIG. 8B shows this alternating stack arrangement with the cathode and anode layers extending out of opposite sides of a stack. The spacer layers are slightly wider than the anodes and cathodes and prevent the edges of the stacked sheets from coming into contact with each other. The individual anode layers are welded or mechanically staked together and then joined by the same means to a contactor bar. The cathode layers are similarly joined together and to a cathode contactor bar. This entire stacked assembly is then placed into a sealed package or case with the ends of the contactor bars passing through the package for external connection to other components. This type of construction allows for variable layer counts for different battery capacities and applications. This type of construction also minimizes ohmic losses during charge and discharge. A final package is shown in FIG. 8C. The connector bars for the anode and cathode layers can pass through the final package or case on either one side each for lower power systems, or on both sides for higher power/higher current applications. The connector bars can be welded, riveted or staked to the battery layers. The external sections of the connector bars can be easily connected to external circuit components such as electrical connectors or cables.

Stacks of alternating electrode and spacer layers are produced, connecting to negative and positive posts or terminals (symmetrical device shown in illustration FIG. 8A) alternately. Notches or holes on alternating sheets of electrode are cut out to prevent contact to the opposite electrode/alignment pins.

In another embodiment, a low-cost supercapacitor (ultracapacitor) or battery has extremely high specific energy, energy density, specific power, power density, capacitance, and/or electrode surface area.

In a further embodiment, the ultracapacitor or battery consists of a layered stack of alternating positive and negative electrodes with separation membranes between the electrodes. The positive electrodes are made with organic polymer nanowires that are chemically synthesized onto a base metal substrate through a linking strategy. The positive electrodes are grown with an electrochemical method that can be automated inexpensively. The negative electrodes are composed of a high surface area aluminum-lithium amalgam and are easily produced in a continuous electrochemical process.

In yet another embodiment, the ultracapacitor requires the combination of high energy density (high surface morphology), successful synthesis on commodity metals, and successful transfer to organic electrolytes.

Final assembly of the cells preferably takes place in a dry environment to prevent reaction of the different materials with water. Typically, the environment must be at a −40° C. dewpoint or lower. This type of environment is usually generated used large desiccant air drying systems. By automating the assembly process and keeping the required dry air volume in the manufacturing area to a minimum, the size and operating cost of a desiccant system can be minimized. Air drying units can be very large sources of power consumption due to their use of heat to regenerate the desiccant beds and due to the large blowers required to maintain air flow. Instead of conducting the final assembly process in a room environment where the volume is large and where people are required to operate, automating the process and keeping the volume to an absolute minimum will save in equipment cost and operating costs.

The equipment is designed around a robotic assembly station with preferably three incoming material feed lines and a secondary assembly chamber. The material feed lines consist of a set of process equipment that can include cutting stations, material feed drives, guiding stations and, in some cases, a material process tank that contains a non-aqueous solution. Each line can have a counterflow drying tunnel to dry the incoming material and prevent moisture ingress through the incoming material.

By making the enclosures just large enough to contain the equipment and with access panels with dry box gloves, the volume of dry air required can be a fraction of that required in a traditional assembly space while still allowing for easy access to various points in the manufacturing equipment. The dry air enclosure includes an aluminum frame structure made from extruded profiles with acrylic and/or polycarbonate panels mounted within the frame. Each panel can be removed for access to the internal machine components and also a set of dry box gloves (long sealed gloves) can be installed in any panel where frequent access or intervention may be required. The dry box gloves allow for operator access while maintaining an air tight and water vapor tight seal. The process equipment is preferably close enough to an enclosure panel to allow for easy operator access. This prevents the need for a person operating within the dry air volume and reduces the moisture load on the system. An airlock is built onto the secondary assembly volume to allow for the insertion and removal of material from the dry air volume. Total enclosed volume for this system can be about 24 m$^3$ (850 ft$^3$). This is a quarter of the volume of a 6 m by 6 m×2.4 m (20'×20'×8') assembly room and there is no burden on the system to remove the moisture load from assembly personnel.

EXAMPLES

The materials and processes of the present invention will be better understood in connection with the following examples, which are intended as an illustration only and not limiting of the scope of the invention.

Example 1

Preparation of PANi Electrode: Ni/4-APA/PANi

Figure 16:
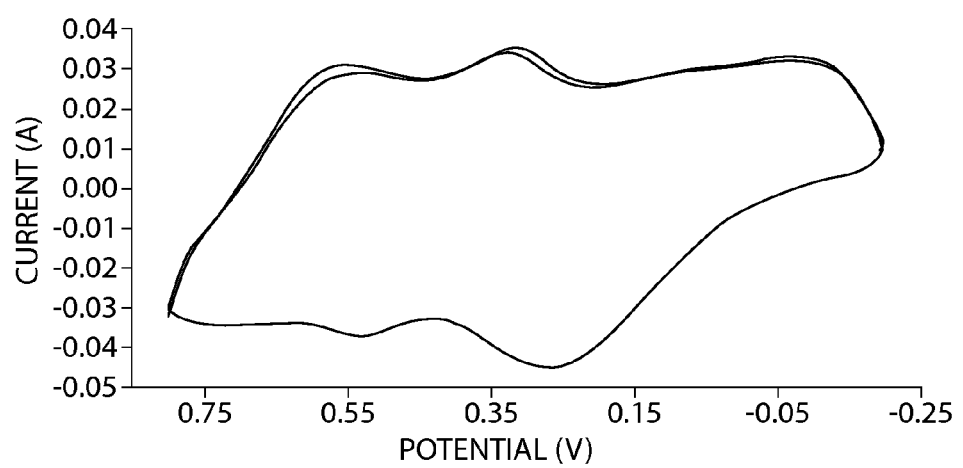
FIGS. 16 and 17: Illustration of cyclic voltammetry of a Ni/C/PANi electrode, as made in Example 2, response of a 20 C film in aqueous low pH solutions and nonaqueous solutions.

Polyaniline is anchored to a metal (M) surface using an aniline derivative as a linking agent (L) to create a M/L/PANi electrode. The nickel surface is first cleaned by chemical or polishing techniques. The surface is then hydroxylated using three cyclic voltammetry sweeps between 0-0.5 V (vs. Ag/AgCl) at 20 mV/sec in a 2M aqueous KOH solution to form Ni—OH moieties. The film is rinsed and a solution containing a linker such as 4-aminophthalic acid (4-APA, CAS#5434-21-9) is allowed to react with the Ni—OH surface by heating in DMSO solution at 65° C. for 10 min. The application of heat in a "dry" organic solvent creates a covalent bond between the Ni—OH surface and the carboxylic acid end of the 4-APA linker, and occurs with the elimination of water. The resulting Ni-4-APA films are rinsed with fresh DMSO, cooled to room temperature and either used immediately or stored in a container containing a desiccant. We note that once the "organic" "hydrophobic" linker is covalently attached to the nickel surface, the coated electrode is stabilized and can be used in aqueous solutions to grow polyaniline fibers utilizing the NH2 group on the end opposite of the 4-APA linker. Polyaniline is then grown onto the Ni/4-APA/films using a two step procedure which involves submerging the films into an low pH aqueous solution containing polyaniline and other chemicals such as camphor sulfonic acid, and immediately subjected the film to a 60 second constant current pulse, @ 1 mA/cm$^2$, that initiates growth of polyaniline "buds" onto the linker end. We note that this step appears to be critically important to producing high surface area growth. The resulting Ni/4-APA/PANi film is then dried under low oxygen conditions and transferred to an organic electrolyte solution. A CV of the resulting electrode is shown in FIG. 16.

Example 2

Preparation of Pani Electrode: Al/C/PANi

Figure 17:
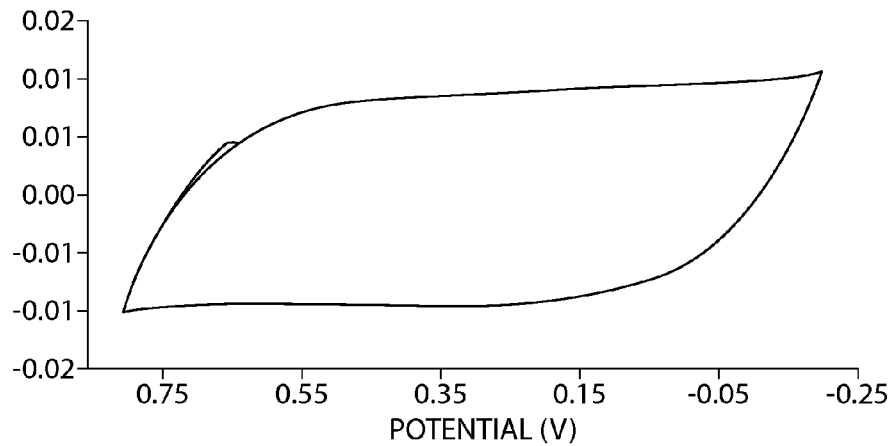
Figure 18:
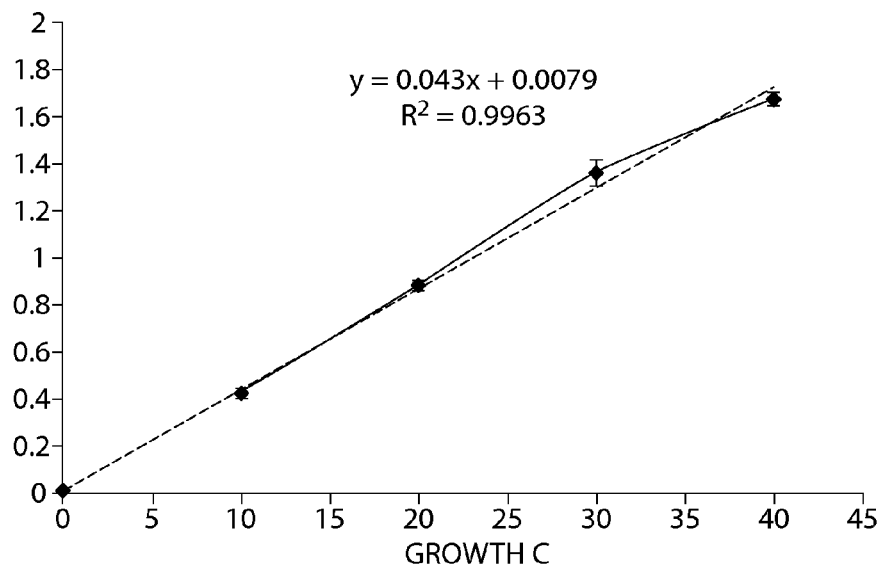
FIG. 18: Illustration of nonaqueous discharge capacity (mAh) for a Ni/C/PANi electrode as a function of total Coulombs of aqueous growth.

Polyaniline is anchored to a metal (M) surface using a carbon-based (carbon, graphite, or graphene=cgg) linking agent (L) to create a M/L/PANi electrode. The Al surface is first cleaned/etched by chemical techniques. The graphite (TIMREX High Surface Graphite, HSAG 300) is deposited on the Al by orbital sander (RYOBI Model # P400). Graphite deposition is carried out for approximately 2 seconds per side of Al with the rate of 11000 orbits per min. Polyaniline is electropolymerized on Al/C electrode using a 3-electrode configuration in a single compartment electrochemical cell with a Ni counter electrode arranged so that it enveloped both sides of the working electrode. A standard Ag/AgCl electrode is used as the reference electrode. The Ni counter electrodes are cleaned by polishing and chemical techniques and immersed in the growth solution containing 0.45 M aniline (Sigma-Aldrich, CAS#62-53-3), 0.2 M camphor-10-sulfonic acid β (Sigma-Aldrich, CAS#5872-08-2) and pH is adjusted to 1.3 by adding H2SO4. The Al/C working electrode is placed in the growth solution between two Ni counter electrode plates with the distance between counter electrode and working electrode approximately 1 cm. Constant potential method is used to grow polyaniline films on Al/C electrodes at 0.75 V vs Ag/AgCl reference (MACCOR, model # series 4300). It is noteworthy that this growth voltage is 50 mV lower than with growth on platinum or other bare metal electrodes. FIGS. 17A and 17B show a typical CV in aqueous and non-aqueous solutions, respectively. The film is then rinsed in 5% hydrazine (Sigma-Aldrich, CAS #302-01-2) solution for 5 min with or without vacuum. The resulting film is then dried by transferring it to an Infra Red drying chamber (300° C.) with or without $N_2$ flow for 5 min. The dried polyaniline film is then transferred into 0.5M $LiClO_4$ in acetonitrile/propylene carbonate (50/50 V/V) nonaqueous solution. See FIG. 5 for typical CV in nonaqueous solutions. The cyclic voltammetry experiments are conducted in this solution on Princeton Applied Research Potentiostat (Model #273) with potential limits of −0.2 V and 0.8V vs Ag/Ag+ standard nonaqueous reference. Longevity tests are performed on MACCOR system with charging the film to 0.8 V with 0.5 mA current rate and discharging to −0.25 V with 0.5 mA current rate. FIG. 18 shows the nearly linear nonaqueous behavior of total capacity to total aqueous coulombic growth of the Al/C/PANi electrode.

Example 3

Negative Electrode

Due to the instability of common non-aqueous electrolyte mixtures in the vicinity of high voltage lithium based negative electrodes, a new slightly lower voltage electrode would be advantageous. Lithium aluminum alloy has an electrochemical potential 0.3 Volts less negative than lithium metal or more importantly the decomposition voltage of propylene carbonate electrolyte solvent. Aluminum is subject to corrosion and must be protected from byproducts generated or present in the electrochemical cell. The following example is a new way to accomplish a high capacity, high current, chemically protected negative electrode for use in lithium based cells.

Step 1. 5052 or other suitable magnesium or other alloy Al foil, 20 microns thick or so is etched in HCl 1 M solution with 5% EG in room temperature degassed DI water, 20 mA/cm² oxidizing current for 3 minutes to produce a high surface area substrate. In this type of electrolytic etch, the thickness of the aluminum foil remains the same even as the porosity is increased. The weight loss in this example can be about 40%. The surface area can be increased by up to a hundred times compared to the bare aluminum foil. Electrical or ionic currents can be increased evidenced by limited voltage drop to maintain these currents. Prior to etch, about 0.25 mA can be passed by a 1 cm² sample. After etch, as much as 10 ma per square centimeter of substrate area (not accounting for the etched enhancement) can be passed for the same voltage drop (0.3V was selected arbitrarily). The micro-etched features minimize cracks due to lithium based swelling and contraction. It is now practical to make aluminum foil into high current Li+ source negative electrode. The foil is then rinsed in DI water for about 5 minutes.

Step 2. When a lithium cell is charged and discharged, trace water in the electrolyte may react on the surface of the lithium donating electrode causing gradual capacity loss. There is a desire to limit this loss and to otherwise protect the surface of the aluminum foil. To this end, zinc, tin or other easily oxidized metal can be plated over the freshly etched aluminum foil. The plating conditions are $NH_4Cl$ 1 M in degassed DI water with 0.1M $ZnCl_2$ at 4 mA/cm² rate in the amount of 0.025 mAHr/cm² or so. The idea is to coat the aluminum with a metal that will oxidize and then to be preferentially and permanently reduced by lithium to form a lithium oxide as a protective coating. The plating should take place immediately after the roughening etch to enhance the adhesion of the new metal. "Immediately" is defined as a short enough time to substantially limit Al oxide growth so that the new metal (Zn, Sn etc.) can plate successfully. The foil is then rinsed in DI water for about 5 minutes.

Step 3. The foil is annealed and dried in an IR oven to oxidize the exposed new metal and to drive off all water. The temperature is between 100 and 500 degrees C., preferably 100 to 200 in dry gas or −40 degrees dew point air to prepare it for processing in non-aqueous electrolyte. The aluminum foil is exposed to this temperature to form a few monolayers of metal oxide on the surface, and not more which would unnecessarily increase the irreversible loss of lithium upon the first charge. The time can be as little as 1 minute in dry air.

Step 4. The foil is now lithiated in a non-aqueous electrolyte solution containing a salt of Lithium with or without a lithium counter electrode. If the salt is LiCl complexed by $AlCl_3$ in PC, for example, the only byproduct of a non-lithium counter electrode setup is $Cl_2$ gas. The current example uses a mixture of 1:1 PC and acetonitrile, 1 molar solution of $AlCl_3$ and 0.1 molar LiCl with a reducing current of 4 mA. In this way, as production goes on, only additional LiCl needs to be added. This process takes place in a −40 degrees C. dew point dry space. During the initial lithiation, any metal (e.g. zinc) oxide will be reduced by the lithium, and that initial lithium material will be oxidized into a protective layer of $Li_2O$. Thereafter, Li+ will permeate the insoluble $Li_2O$ and lithiate the underlying aluminum (or other Li active material e.g. zinc, tin etc). The foil is lithiated to a minimum amount, in order for it to take on a −2.7 Volt electrochemical potential with respect to an Ag/AgCl reference electrode. This amount relates to about 0.25 mAHr/cm² or about 10% by aluminum atomic count. Irreversible Li losses include both the minimum aluminum % plus the small $Li_2O$ forming loss. The reducing current is set to 4 mA but may be lower or as high as 10 mA without altering the Li+ insertion voltage that lies between −2.7 and −3.0 Volts re. Ag/AgCl.

When pairing a polyaniline and aluminum foil electrode together to form an electrochemical cell, it is necessary to account for lithium ions in particular (since most of the useful anions are relatively insoluble and don't move far). The diagram on the left shows how the charge state of a polyaniline positive electrode determines the level of incorporated lithium ions. The diagram on the right indicates a "plateau" of at −2.7 Volts for lithiation percentages between about 10 and 50%. Therefore if the polyaniline is carrying a charge state of −0.2 and matched to the negative electrode carrying a minimum level of lithiation, it will make best utilization of lithium without over-lithiating the negative electrode, which can be damaging. If the negative electrode is not lithiated to the minimum value according to the graph, then some of the lithium originating during the initial charge will be lost due to the initial irreversible capacity of the aluminum.

Energy Density

Figure 9:
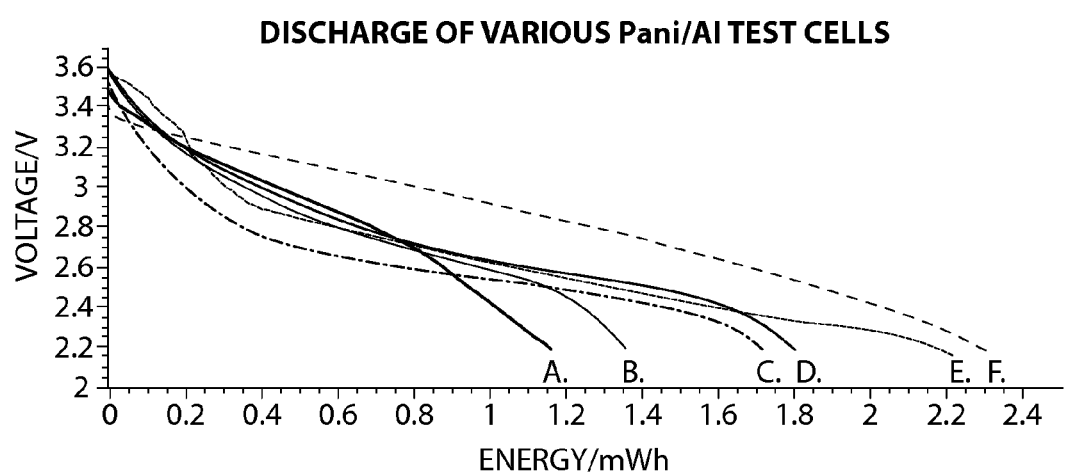
FIG. 9: Ultracapacitor performance as a function of pH and dopant level.
Figure 10A:
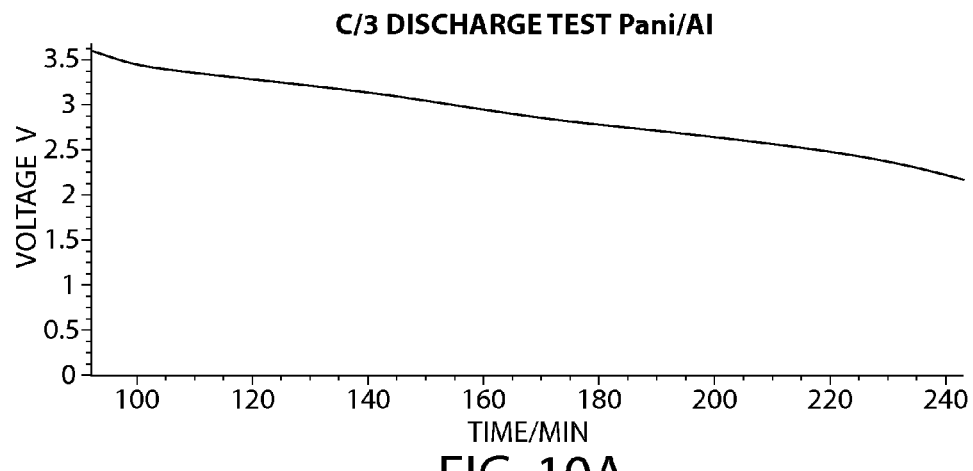
FIGS. 10A and 10B: Discharge curves.
Figure 10B:
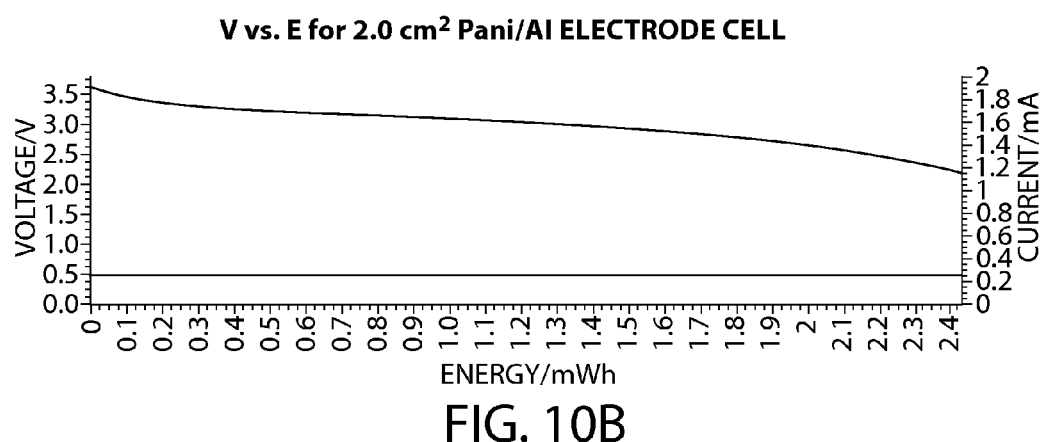
Figure 11:
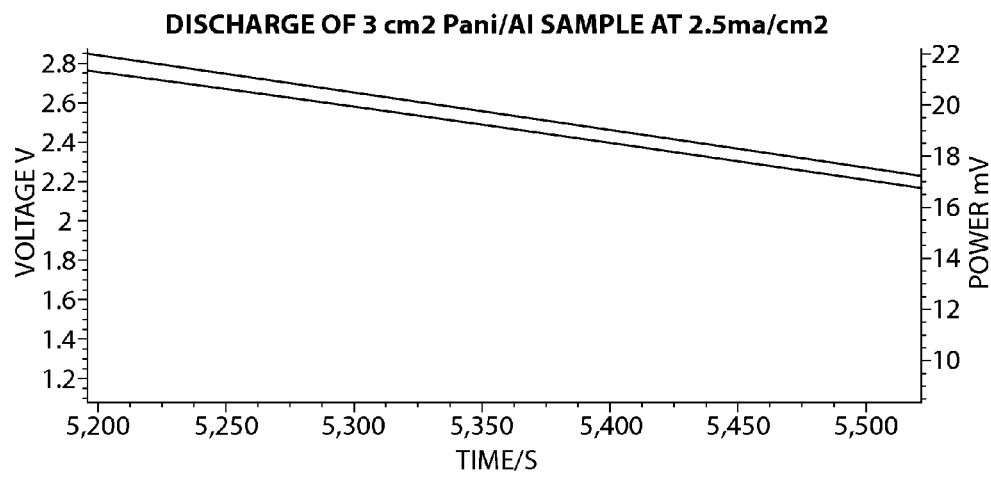
FIG. 11: Discharge curve at constant current of 2.5 $mA/cm^2$.

Ultracapacitor cells with polyaniline positive electrodes synthesized on nickel and Al—Li negative electrodes have been progressively optimized using an experimental approach. As shown in the graph below, subtle changes in combinations of pH and dopant can result in changes to electrical performance. Shown in FIG. 9 are films A-E that were classified relatively as poor, average, and promising. Film E and F represents promising results at a certain pH (adjusted using $H_2SO_4$) and dopant (CSA) level. Relative results are explained below:

Film A: Higher pH, 2× dopant level: higher pH slows growth and added dopant grows denser PANI fibers. Film result: poor performance.

Film B: Lower pH, same dopant level: lower pH speeds film growth but is destructive to film morphology because not enough dopant is present. Film result: poor performance.

Film C: Lower pH, 2× dopant: lower pH speeds film growth and higher dopant protects film. Film Result: average film performance.

Film D: Higher pH, same dopant level: higher pH slows growth. Result: average film performance.

Film E and Film F: similar pH and dopant level. However, in Film F the Li—Al electrode was altered showing improved performance over E.

Performance variation is seen over a range of variables. The competition between the dopant acid (CSA) and the general electrolytic acid (in this test series, $H_2SO_4$) influences morphology and electrical performance (as well as longevity, not shown). Other parameters such as synthesis voltage, temperature, and transfer conditions are shown to be important.

The performance characteristics of these synthesized films are based on the rinsed and dried microbalance weights and micrometer measured thickness. The thickness of the above reported films is between 10 and 30 microns, such as about 11 microns, and the mass is about 0.0009 grams/cm$^2$. These values of weights and thickness are typical for the fabrication and testing procedure used to evaluate growth variables.

The capacitance measured on discharge curve (F) on FIG. 9 above is about 0.91 F/cm$^2$, which corresponds to over 1000 F/g of polyaniline. This value compares favorably with several electrolytically grown polyaniline nanowire demonstrations on platinum.

The electrical and physical data given here is used in the Computation Model of Specific Energy, Energy Density, Specific Power and Power presented below. Among other parameters, film thickness, energy density per square centimeter, and mass are entered into the model.

RAW Data at Fast Discharge Rate—can be used to compute specific power and power density for 30 s at 80% DOD.

A similar constant current discharge test, performed this time at 2.5 mA/cm$^2$, may be used to calculate the "maximum" power deliverable for 30 seconds commencing with 80% DOD.

The 30 second interval commencing with 80% DOD (5225-5250 seconds) indicates a power during that time of 7 mw/cm$^2$.

Preliminary Measurements of Cycle Life

Accelerated lifetime experiments on the polyaniline electrode using a platinum substrate show no material degradation after 25,000 charge-discharge cycles. Below, two overlaid CV curves demonstrate little degradation after 5000 and 25000 operating cycles on the aforementioned platinum electrode test.

Figure 12:
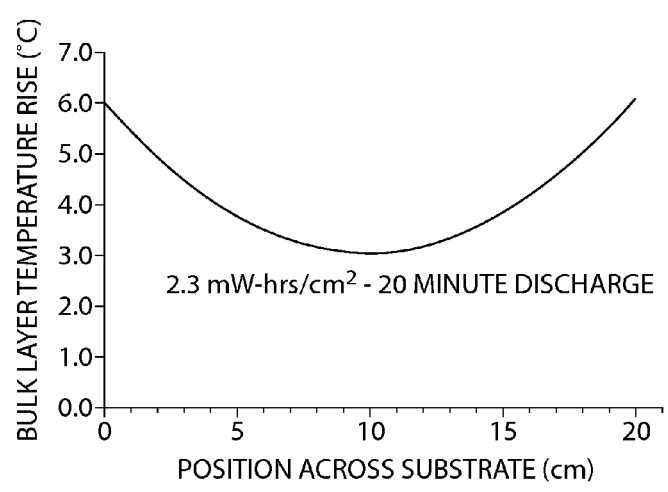
FIG. 12: Thermal model, showing adequacy of 4 micron substrate thickness.
Figure 13:
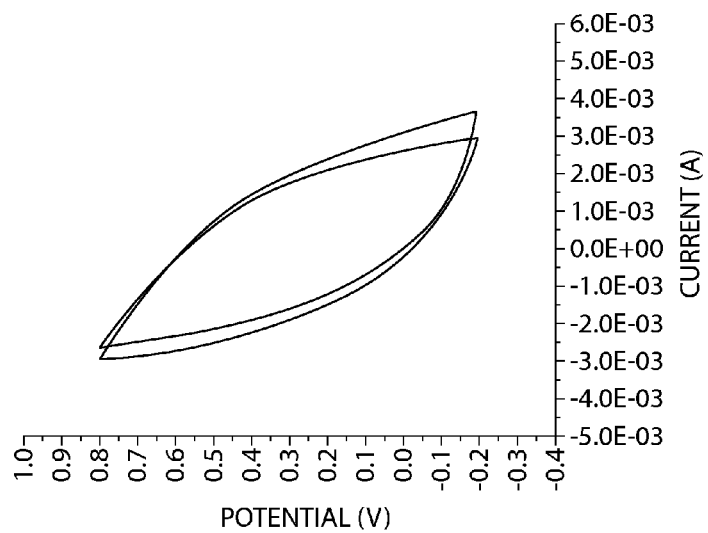
FIG. 13: Cycle testing of polyaniline on a base metal electrode.

A similar accelerated test on a polyaniline electrode using a modified base metal substrate has been conducted. This CV test, run at a 4 mV/sec sweep rate, shows little degradation through 850 cycles. In FIG. 12, the lines compare the 50$^{th}$ and 850$^{th}$ cycle. Note that the voltage in this test is shown against an Ag/AgCl reference.

Figure 14:
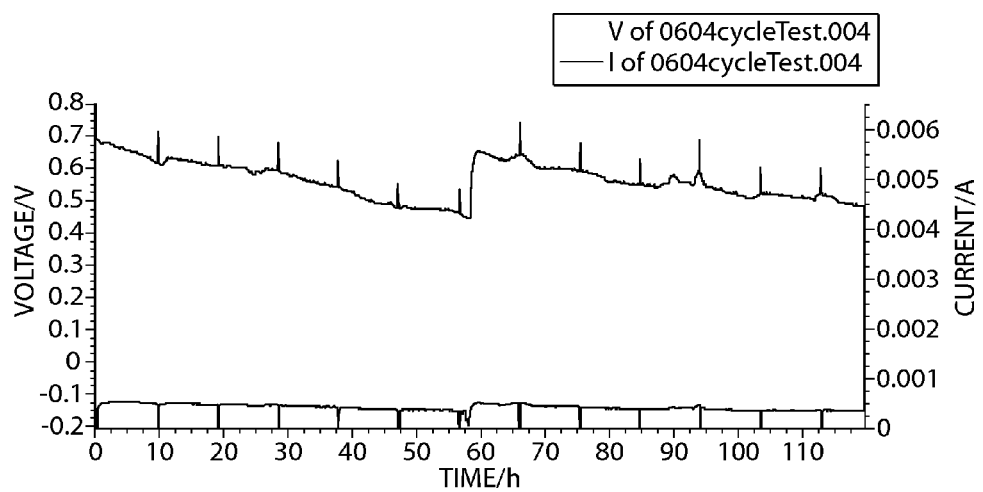
FIG. 14: Illustrates performance of a half cell arrangement of polyaniline electrochemically synthesized onto graphite scrubbed Aluminum 1145.
Figure 15:
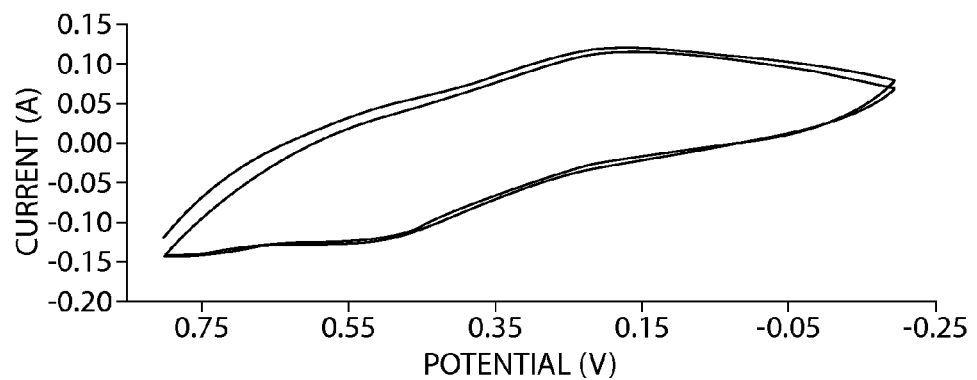
FIG. 15: Illustration of cyclic voltammetry of a Ni/4-APA/PANi electrode, as made in Example 1, response in aqueous low pH solutions.

The following FIG. 14 describes performance of a half cell arrangement of polyaniline electrochemically synthesized onto graphite scrubbed Aluminum 1145. The sweep rates were roughly equivalent to 15 mv/sec. for 250 cycles, and then one cycle at an equivalent of 4 my/sec sweep rate. This half cell test was continued for over 4000 cycles as shown here. Since peak currents are proportion to capacity, they are used here to monitor longevity of the film at the two charge and discharge rates. Over the course of this test, the peak currents declined by only 21%. We recognize that, a shift of performance occurred near the center of the test period, and this may be attributed to a change in the room temperature of the test lab over the same period. Performance has increased to 0.8 mAhr/cm$^2$, which, if discharged against a suitable negative electrode such as lithiated aluminum resulting in a full cell average voltage of 3.7 V. Etched, lithiated aluminum 5052 are preferred. Initial cycle tests (over 600) have been measured in half cell with a silver wire pseudo reference electrode. Initial measured values of 1 mAhr/cm$^2$ capacity exceed that of the positive electrode, and appear sufficient to support our full cell voltage assumptions.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method for the synthesis of polymer electrodes comprising:
   a. providing a support comprising one or more conductive metal surfaces selected from the group consisting of aluminum and nickel;
   b. contacting the support with a solution in a first reaction zone comprising aniline and a sulfonic acid in the presence of at least one electrode wherein the voltage potential of said electrode is altered between two or more voltage states and current is pulsed, thereby initiating polymer growth; and
   c. sustaining polymer growth on the substrate in a second reaction zone wherein the voltage potential and/or current is maintained substantially constant.

2. The method of claim 1, wherein the solution is saturated with aniline.

3. The method of claim 1, wherein the first and second reaction zones are in fluid communication.

4. The method of claim 1, wherein conductive metal is layered on a non-conductive substrate.

5. The method of claim 1, wherein the support is maintained in the solution of step (b) for less than one minute.

6. The method of claim 1, wherein a substantially constant voltage is maintained in step (c).

7. The method of claim 1, wherein a substantially constant current is maintained in step (c).

8. The method of claim 1, wherein the support is maintained in the solution of step (c) for at least about 1 minute.

9. The method of claim 1, wherein the process is continuous.

10. The method of claim 1, further comprising washing and drying the product of step (c).

11. The method of claim 1, wherein the substrate is guided through the reaction zones using perforated guide rollers having a diameter substantially larger than the thickness of the substrate and having a fluid discharged therefrom to maintain a fluid gap.

12. The method of claim 1, wherein the substrate is directed between at least one set of electrodes.

13. The method of claim 12, wherein the substrate is directed between a plurality of sets of electrodes, wherein the electrodes are maintained under independent control.

14. The method of claim 13, wherein the plurality of sets of electrodes are configured in a stacked configuration.

15. The method of claim 13, further comprising the step of drying the product with at least two opposing infrared heat lamps.

16. The method of claim 15, wherein the product is dried while applying a countercurrent drying gas.

* * * * *